(12) United States Patent
Sandoval et al.

(10) Patent No.: US 8,402,081 B2
(45) Date of Patent: Mar. 19, 2013

(54) PLATFORM FOR DATA AGGREGATION, COMMUNICATION, RULE EVALUATION, AND COMBINATIONS THEREOF, USING TEMPLATED AUTO-GENERATION

(75) Inventors: Michael Sandoval, Kirkland, WA (US); Joseph Jonas, Seattle, WA (US)

(73) Assignee: Atigeo, LLC, Bellevue, WA (US)

( * ) Notice: Subject to any disclaimer, the term of this patent is extended or adjusted under 35 U.S.C. 154(b) by 870 days.

(21) Appl. No.: 12/392,900

(22) Filed: Feb. 25, 2009
(Under 37 CFR 1.47)

(65) Prior Publication Data
US 2010/0023952 A1     Jan. 28, 2010

Related U.S. Application Data

(60) Provisional application No. 61/067,162, filed on Feb. 25, 2008.

(51) Int. Cl.
*G06F 15/16* (2006.01)

(52) U.S. Cl. ........................................ 709/201

(58) Field of Classification Search .................. 707/269; 709/201–203
See application file for complete search history.

(56) References Cited

U.S. PATENT DOCUMENTS

| | | | |
|---|---|---|---|
| 6,385,602 B1 | 5/2002 | Tso et al. | 707/3 |
| 6,408,290 B1 | 6/2002 | Thiesson et al. | 706/52 |
| 6,434,556 B1 | 8/2002 | Levin et al. | |
| 6,453,347 B1 | 9/2002 | Revashetti et al. | |
| 6,560,590 B1 | 5/2003 | Shwe et al. | 706/55 |
| 6,581,072 B1 | 6/2003 | Mathur et al. | |
| 6,961,731 B2 | 11/2005 | Holbrook | |
| 7,149,733 B2 | 12/2006 | Lin et al. | 707/4 |
| 7,191,182 B2 | 3/2007 | Anonsen et al. | 707/100 |
| 7,237,245 B2 | 6/2007 | Hinson et al. | 719/318 |
| 7,257,817 B2 | 8/2007 | Cabrera et al. | 719/310 |
| 7,296,022 B2 | 11/2007 | Harjanto | 707/10 |
| 7,627,599 B2 | 12/2009 | Heer et al. | |
| 7,644,098 B2 | 1/2010 | Patel et al. | 707/101 |

(Continued)

FOREIGN PATENT DOCUMENTS

| | | |
|---|---|---|
| WO | 2004/066163 A1 | 8/2004 |
| WO | 2009/081393 A2 | 7/2009 |

(Continued)

OTHER PUBLICATIONS

Extended European Search Report mailed Jun. 6, 2011 for Application No. 11150913.9.

(Continued)

*Primary Examiner* — Jason Recek
(74) *Attorney, Agent, or Firm* — Dorsey & Whitney LLP

(57) ABSTRACT

Embodiments of the present invention provide platforms for data aggregation, communication, rule evaluation, and combinations thereof. The platform may include three distinct functional layers; a core layer, an adaptive layer and an intelligence layer. Furthermore, the platform may include a data block, messaging block, rule block, or combinations thereof. Generally, the platform may facilitate data acquisition, storage, and manipulation between and among clients and data sources in a generic manner. That is, clients may communicate and make requests independent of a target system or database type. The platform may process the communications and requests in a manner suitable to the target system or database type. The platform may also evaluate rules received from the clients in a manner generic to the client application. Instances of the platform for a given application may be efficiently created using a template-based mechanism. In this manner, the platform may be used to support a variety of end user applications in a flexible, scalable manner.

16 Claims, 20 Drawing Sheets

U.S. PATENT DOCUMENTS

| | | | |
|---|---|---|---|
| 7,779,004 | B1 | 8/2010 | Walsh et al. |
| 7,801,901 | B2 | 9/2010 | Surendran |
| 2002/0129014 | A1 | 9/2002 | Kim et al. ............ 707/5 |
| 2002/0184401 | A1 | 12/2002 | Kadel, Jr. et al. ......... 709/315 |
| 2003/0154129 | A1 | 8/2003 | Goff |
| 2003/0204496 | A1 | 10/2003 | Ray et al. ............ 707/3 |
| 2003/0229507 | A1 | 12/2003 | Perge |
| 2004/0128508 | A1 | 7/2004 | Wheeler et al. |
| 2004/0158569 | A1 | 8/2004 | Evans et al. ........... 707/100 |
| 2005/0043989 | A1 | 2/2005 | Shifrin ............ 705/14 |
| 2005/0076060 | A1 | 4/2005 | Finn et al. |
| 2005/0216434 | A1 | 9/2005 | Haveliwala et al. |
| 2005/0222989 | A1 | 10/2005 | Haveliwala et al. |
| 2005/0223368 | A1* | 10/2005 | Smith et al. ........... 717/128 |
| 2005/0257400 | A1 | 11/2005 | Sommerer et al. |
| 2006/0122994 | A1 | 6/2006 | Kapur et al. ............ 707/4 |
| 2006/0195515 | A1 | 8/2006 | Beaupre et al. ............ 709/203 |
| 2006/0277157 | A1* | 12/2006 | Seidl et al. ............ 707/2 |
| 2006/0277248 | A1* | 12/2006 | Baxter et al. ........... 709/201 |
| 2006/0294084 | A1 | 12/2006 | Patel et al. ............ 707/3 |
| 2007/0038608 | A1 | 2/2007 | Chen |
| 2007/0038765 | A1 | 2/2007 | Dunn |
| 2007/0100898 | A1 | 5/2007 | Petras et al. ........... 707/200 |
| 2007/0106659 | A1 | 5/2007 | Lu et al. ............ 707/5 |
| 2007/0130109 | A1 | 6/2007 | King et al. ............ 707/2 |
| 2007/0136371 | A1 | 6/2007 | Golobay et al. ........... 707/104.1 |
| 2007/0162443 | A1 | 7/2007 | Liu et al. |
| 2007/0168546 | A1 | 7/2007 | Greeff ............ 709/238 |
| 2007/0198328 | A1* | 8/2007 | Fuller et al. ........... 705/10 |
| 2007/0225995 | A1 | 9/2007 | Moore |
| 2007/0266019 | A1 | 11/2007 | Lavi ............ 707/5 |
| 2008/0009268 | A1 | 1/2008 | Ramer et al. ............ 455/412.1 |
| 2008/0040219 | A1 | 2/2008 | Kim et al. |
| 2008/0046313 | A1 | 2/2008 | Chen ............ 705/14 |
| 2008/0052309 | A1* | 2/2008 | Underseth ............ 707/102 |
| 2008/0104048 | A1 | 5/2008 | Surendran |
| 2008/0134086 | A1 | 6/2008 | Liao et al. ............ 715/810 |
| 2008/0140521 | A1 | 6/2008 | Jambunathan et al. ......... 705/14 |
| 2008/0263022 | A1 | 10/2008 | Kostorizos et al. |
| 2008/0300986 | A1 | 12/2008 | Lee ............ 705/14 |
| 2009/0063473 | A1 | 3/2009 | Van Den Berg et al. |
| 2009/0070412 | A1 | 3/2009 | D'angelo et al. |
| 2009/0094093 | A1 | 4/2009 | Phan ............ 705/10 |
| 2009/0106324 | A1 | 4/2009 | Gutlapalli et al. ............ 707/202 |
| 2009/0171697 | A1 | 7/2009 | Glauser et al. |
| 2009/0216563 | A1 | 8/2009 | Sandoval et al. |
| 2009/0216639 | A1 | 8/2009 | Kapczynski et al. |
| 2009/0216696 | A1 | 8/2009 | Downs et al. |
| 2009/0216750 | A1 | 8/2009 | Sandoval et al. |
| 2009/0287683 | A1 | 11/2009 | Bennett |
| 2009/0327259 | A1 | 12/2009 | Smith |
| 2009/0327327 | A1 | 12/2009 | Sathish |
| 2010/0153324 | A1 | 6/2010 | Downs et al. ........... 706/21 |
| 2010/0228715 | A1 | 9/2010 | Lawrence ............ 707/706 |
| 2010/0328312 | A1 | 12/2010 | Donaldson |

FOREIGN PATENT DOCUMENTS

| | | | |
|---|---|---|---|
| WO | 2009/108724 A2 | 9/2009 | |

OTHER PUBLICATIONS

International Search Report and Written Opinion mailed Nov. 9, 2009 for International Application No. PCT/US2009/035197.

Office Action dated Apr. 28, 2011 for EP Application No. 09714387.9.

Related U.S. Appl. No. 13/102,706, filed May 6, 2011.

Fiaidhi et al. "A Standard Framework for Personalization Via Ontology-Based Query Expansion", Pakistan Journal of Information and Technology 2 (2); 2003; pp. 96-103.

Riezler et al. "Statistical Machine Translation for Query Expansion in Answer Retrieval"; retrieved on Feb. 24, 2009 from http://www.scialert.net; pp. 1-7.

Amazon.com; "Statistically Improbable Phrases"; retrieved on Feb. 24, 2009, from http://amazon.com/gp/search-inside/sipshelp.html; pp. 1.

Choicestream.com; "About ChoiceStream"; retrieved on Feb. 24, 2009, from http://choicestream.com/company; pp. 1-2.

Matchmine.com; "Frequently Asked Questions"; retrieved on Feb. 24, 2009, from http://web.archieve.org/web/20071026055031m_1/www.matchmine.com/help; pp. 1-2.

Peltarion; "Applications of Adaptive Systems"; retrieved on Feb. 24, 2009, from http://peltarion.com/doc/index.php?title=Applications_of_adaptive_systems; pp. 1-7.

Strands; "Company Overview"; retrieved on Feb. 24, 2009, from http://corp.strands.com/; pp. 1.

Strands; "History and Name"; retrieved on Feb. 24, 2009, from http://corp.strands.com/history; pp. 1-2.

Wikipedia; "Query Expansion"; retrieved on Feb. 24, 2009 from http://en.wikipedia.org/wiki/Query_expansion; pp. 1-3.

Wikipedia; "Recommender System"; retrieved on Feb. 24, 2009 from http://en.wikipedia.org/wiki/recommendation_engine; pp. 1-4.

Wikipedia; "tf-idf"; retrieved on Feb. 24, 2009 from http://en.wikipedia.org/wiki/Tf-idf; pp. 1-3.

Burke R.; "Hybrid Recommender Systems: Survey and Experiments"; User Modeling and User-Adaptive Interaction; Nov. 2002; pp. 1-29.

Zhang S. et al. "An Online Personalized Recommendation Model Based on Bayesian Networks"; 2007; retrieved on Aug. 21, 2009 from http://springerlink.com/content/r827252065g60728/, pp. 1575-1584.

Sun Microsystems; "Metadata for Object Relational Mapping"; Enterprise JavaBeans 3.0, Final Release; May 2, 2006; pp. 163-208.

Jeffrey M. Barnes; "Object-Relational Mapping as a Persistence Mechanism for Object Oriented Applications"; An honors project presented to the Department of Mathematics and Computer Science; Apr. 28, 2007; pp. 3-113.

Kngine "Web 3.0 Search Engine"; Kngine Overview; pp. 1-4.

Branzan, Claudiu et al., "Relevance Networks for Cold Start Inference of User Preferences", http://snowbirb.djvuzone.org/2010/posters.html, 2010.

\* cited by examiner

| Method A | | | 355 |
|---|---|---|---|
| Parameter 1 357 | Type 361 | Value 365 | |
| Parameter 2 359 | Type 363 | Value 367 | |
| Trigger Indicator | | | 358 |
| Method B | | | 360 |
| Parameter 3 370 | Type 372 | Value 374 | |
| Trigger Indicator | | | 376 |

| | |
|---|---|
| Statement | 655 |
| Format with placeholders | 660 |
| Reference to placeholder template(s) | 665 |
| Placeholder Template | 670 |
| Format | 675 |
| Fieldmask | 680 |

PLATFORM FOR DATA AGGREGATION, COMMUNICATION, RULE EVALUATION, AND COMBINATIONS THEREOF, USING TEMPLATED AUTO-GENERATION

CROSS-REFERENCE TO RELATED APPLICATION(S)

This application claims the benefit of the filing date of U.S. Provisional Application Ser. No. 61/067,162, filed Feb. 25, 2008, the entire disclosure of which is considered to be part of the disclosure of the instant application and is hereby incorporated by reference herein for any purpose.

TECHNICAL FIELD

Embodiments of the invention relate to methods and systems for robust data handling, in particular generic formulations for dynamically communicating, manipulating, storing, or taking a combination of those actions with a variety of data sources and client types.

BACKGROUND

Widespread use and acceptance of computer systems has resulted in a proliferation of data. A wide variety of enterprises and individuals generate and store large amounts of data. Data mining and analysis has therefore become increasingly important as people and enterprises try to glean intelligence from their data.

However, data mining and analysis efforts have been hampered by the large and disparate formats in which data may be stored and manipulated. Custom software is typically required to build system-wide solutions that combine data in a particular way, or implement a specific analysis technique.

For example, a retail store seeking to store, mine and analyze their data in a meaningful way faces a variety of challenges. The store may want to collect data from a variety of locations. One source of data is the store itself—inventory on hand, and daily sales, for example. Another source of data are the store's suppliers. The suppliers all may have their own data about inventory availability, price, and selection. The store's customers may also have their own data about their purchase history at that and other stores and demographic data, for example.

Store personnel generally are required to make a variety of decisions—such as which items to order, and how much of each item to order and at what time. Knowledge and the ability to analyze data from all of the above-mentioned sources may be able to aid in this decision, but only if the data is readily available and can be analyzed in accordance with criteria that will be useful to the store personnel.

Creating a software solution that is able to aid the store personnel in a meaningful way may require the ability to interface with the disparate systems that hold the store data, supplier data or data of other external entities, and customer data. Moreover, the software solution must be able to manipulate this information in accordance with the analytical criteria the store personnel would like evaluated.

Of course, many existing software systems aimed to mitigate communication between specific disparate data types or conduct a specific type of analysis on a given set of data. However, software developers routinely focus only on the problem at hand and build a specific software solution to connect the store's database with the database of the supplier, for example. The software itself is likely to depend on the particular data attributes used by the store and the supplier.

Similarly, a software developer is likely to build an analytics solution that specifically answers the question posed by the store personnel. The analytics solution may be hardcoded to process the specific attribute types contained in the supplier and store databases, and compute one or a series of specific calculations desired by store personnel.

Accordingly, when the store or the supplier or a customer changes or adds a database type, a data attribute, or when store personnel would like data analyzed in a new manner, the software developer is required to intervene and change the software code used to analyze the data. This process may be cumbersome and it may limit the store's ability to have rich interactions with its data and change the analytical techniques used or the type of data analyzed.

Furthermore, due to the specific nature of the software involved, the store's solution will be unsuitable for another entity trying to perform a completely different data analysis task. For example, the store's inventory software solution would be completely unsuitable for analyzing traffic patterns on a nearby interstate. To handle traffic pattern analysis, the software developer would need to develop a new software solution from the ground up.

A brief summary of challenges in three areas are described below: 1) storing and sharing data amongst different database types; 2) communicating between different and unknown system types; and 3) acting on stored information.
Storing and Sharing Data A brief overview of database storage and interoperability challenges will be described with reference to FIG. 1. Electronic databases, such as database 10 in FIG. 1, store data and are configured to access and manipulate the stored data according to various objects specified by the database, such as ObjectA in FIG. 1. An object is generally a collection of data and methods for manipulating the data. The objects may specify a variety of methods for manipulating the data, including methods for creating, reading, updating or deleting data entries in the database. MethodA and MethodB are shown in FIG. 1 associated with ObjectA.

An application programming interface (API) 15 provides access to the methods in the database 10. The API 15, for example, supports MethodA and MethodB used in the database 10. Clients access the database 10 by communicating a message 20 to the API 15. The message includes one of the functions supported by the API. So, for example, in FIG. 1, Client 25 passes a message 20 that includes a request to execute 'MethodA' and parameters for the execution of MethodA. Recall that MethodA is a specific method supported by the database 10.

Accordingly, the API 15 may achieve relatively high performance, because little if any manipulation must be performed on the received message 20 before passing a function call 30 to the database 10 to perform MethodA with the enclosed parameters. However, the API 15 is not very flexible.

For example, if database 10 stores customer information, ObjectA may refer to a customer, and MethodA may include a method entitled 'GetCustomer' which operates to retrieve a customer number based on an order number and a purchase date. Code used to implement the API 15 may then include the statement:

int GetCustomer (int OrderNumber, Date Time, PurchaseDate);

'int' indicates the API is expecting an integer (the customer number) returned from this call. The API also expects an integer order number and a date/time formatted purchase date to be transmitted along with the request. Message 20 must then include "GetCustomer (OrderNumber, PurchaseDate)".

The API then passes the message 20 as a function call 30 to the database 10. Databases have various internal mechanisms for communication and formatting for function calls and parameters including any of a variety of querying languages specific to the database type such as SQL, a relational database query language or the like. The API 15 is specific to the database 10 and formats the message 20 into a proper function call 30 for the database 10.

There are several drawbacks to this approach for database communication that become increasingly apparent as databases become increasingly complex and numerous.

A first drawback is that the API 15 supports only the specific methods supported by the database 10. Once the source code for the API 15 is compiled, it becomes a static entity and cannot support any further methods. If the database 10 is changed to a different database that supports, say, MethodC instead of MethodA, the API 15 will not be able to generate a function call for MethodC. The API 15 will need to be rewritten and recompiled to support the new method. This requires that the API 15 be taken off-line (stopped or taken out of service) while a new API is written, compiled, and put back into service.

Another drawback is that the API 15 supports only the specific communication language used by the database 10. The API 15 only formats messages for a particular database language. Again, if the database 10 is changed to a different database utilizing some other internal language, the API 15 must be rewritten and recompiled, requiring time and a suitably skilled operator to perform the update.

The above drawbacks to database communication apply generally to all available database types including relational databases and object-oriented databases. Older database models, such as hierarchical and network models, also have the described drawbacks.

Communicating Between Different or Unknown System Types

As data collection and mining become increasingly important and sophisticated, communicating among complex systems for storing and manipulating data has become difficult. Separate applications or systems have their own internal methods of communicating and syntax and vocabulary for storing and manipulating data. A same or similar procedure may have different names in different databases or systems, for example. One application may want to call that procedure in a variety of different databases.

Present systems handle this communication difficulty by calling the specific procedure name for each system of interest. For example, a code fragment from a first system may call an IOrderFulfillment interface as part of the implementation of a call implementing an interface for accepting orders. An interface is generally a portion of code that receives calls from clients and mediates access to an underlying procedure or data store. The Accept Order class may be coded as follows:

```
public void AcceptOrder (string Order)
{
    IOrderFulfillment iof = new OrderFulfillmnet( );
    iof.FulfillOrder(Order);
}
```

This class needs to communicate with the IOrderfulfillment interface, implemented by a second system. The Fulfillment interface may itself need to communicate with a further interface, such as a shipment interface. The second system may encode an order fulfillment interface as follows:

```
public interface IOrderFulfillment
{
    void FulfillOrder (string Order);
}
public class OrderFulfillment : IOrderFulfillment
{
    public void FulfillOrder(string Order)
    {
    IOrderShipment iof = new OrderShipment( );
    iof.ShipOrder(Order);
    iof = new OrderShipmentEx( );
    iof.ShipOrder(Order);
    }
}
```

The above examples contains two separate calls to an order shipment interface—one to OrderShipment( ) and one to OrderShipmentEx( ). These two consecutive calls are necessary to communicate with a third and fourth system, each of which implement the order shipment interface. One implementation, the third system, codes the order shipment interface as:

public class OrderShipment:IOrderShipment

Another implementation, the fourth system, implements the order shipment interface as:

public class OrderShipmentEx:IorderShipment

The second system above was accordingly required to make two consecutive calls, one to the order shipment interface as specifically implemented by the third system and the other to the order shipment interface as specifically implemented by the fourth system. A problem may arise if the third or fourth system, or both, are changed to different or new systems that no longer support the particular format of the calls made by the second system. If the implementation of the shipment interface changes, the implementation of the fulfillment interface of system two must be correspondingly changed and recompiled, which may be undesirable.

Acting on Stored Information

A variety of actions may be desirable using collected, stored data. In particular, an organization or entity may desire to evaluate a variety of conditions on stored data. However, the conditions will vary according to the type of data and the purposes of the requestor. For example, a thermostat application may desire to set a temperature to a warm setting if stored data indicates it is cold outside and it is the morning. This is a simple example of a type of rule that an application may desire to evaluate. The permutations of rules may vary widely according to the end use of an application, and the types of data available.

The common approach to the execution of rules would be to hard code the rule into the software system. So for example, a thermostat application may contain lines of code that are specific to the condition and action described above, that is, to temperature and temperature settings. The code would explicitly recite parameters such as 'temperature' and 'set'. Should the users of a temperature application want to implement a different rule—for example, if an occupant is detected in a room, set the temperature to a certain level, or if it is night then set temperature to cold—a new code would be required to implement and evaluate the rule. This may require taking the system offline, preparing code, recompiling the code, and restarting the system.

The above description identifies some of the challenges in supplying a robust, scalable, rule-based expert system. While software may be prepared to interface specific disparate data systems and evaluate rules for a particular given end use, the resultant software application may be no more flexible than before. That is, the software is still confined to the particular use for which it was designed, and the specific systems for which it was designed to integrate. The addition or subtraction of systems, or the revision, addition, or subtraction of rules to be evaluated may require stopping the system, commissioning the preparation of specific new software code, re-compiling the software, and redeploying the software solution. This procedure may be cumbersome and limit the usefulness of any one particular software solution. Ultimately the time involved in a system shutdown, code drafting, re-compiling, and re-deployment, along with additional time for testing, may be prohibitive in designing or deploying a system change.

BRIEF DESCRIPTION OF THE DRAWINGS

FIG. 6 is a schematic diagram of a payload according to an embodiment of the present invention.

FIG. 10 is a schematic diagram of a template according to an embodiment of the present invention.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known computer systems and architecture, software operations and protocols have not been shown in detail in order to avoid unnecessarily obscuring the described embodiments of the invention. Embodiments of the present invention may be implemented in all or in part as executable instructions encoded in a computer-readable medium that, when executed, cause one or more processors to perform the functionalities described. In some embodiments, hardware or firmware may be used in all or in part to perform the functionalities.

Section headings may be used in this document. The section headings are intended only as an explanatory guide to the document. The section headings are not meant to imply that all information related to the heading is found in that section, or that no information related to that heading may be found in other sections. To the contrary, embodiments of the present invention provide integrated systems whose individual components may be highly interrelated. Accordingly, information about any one component may impact the functionality and workings of other components. Accordingly, individual components should be interpreted in light of the entire description herein, and their description is not isolated to any one section.

Figure 2:
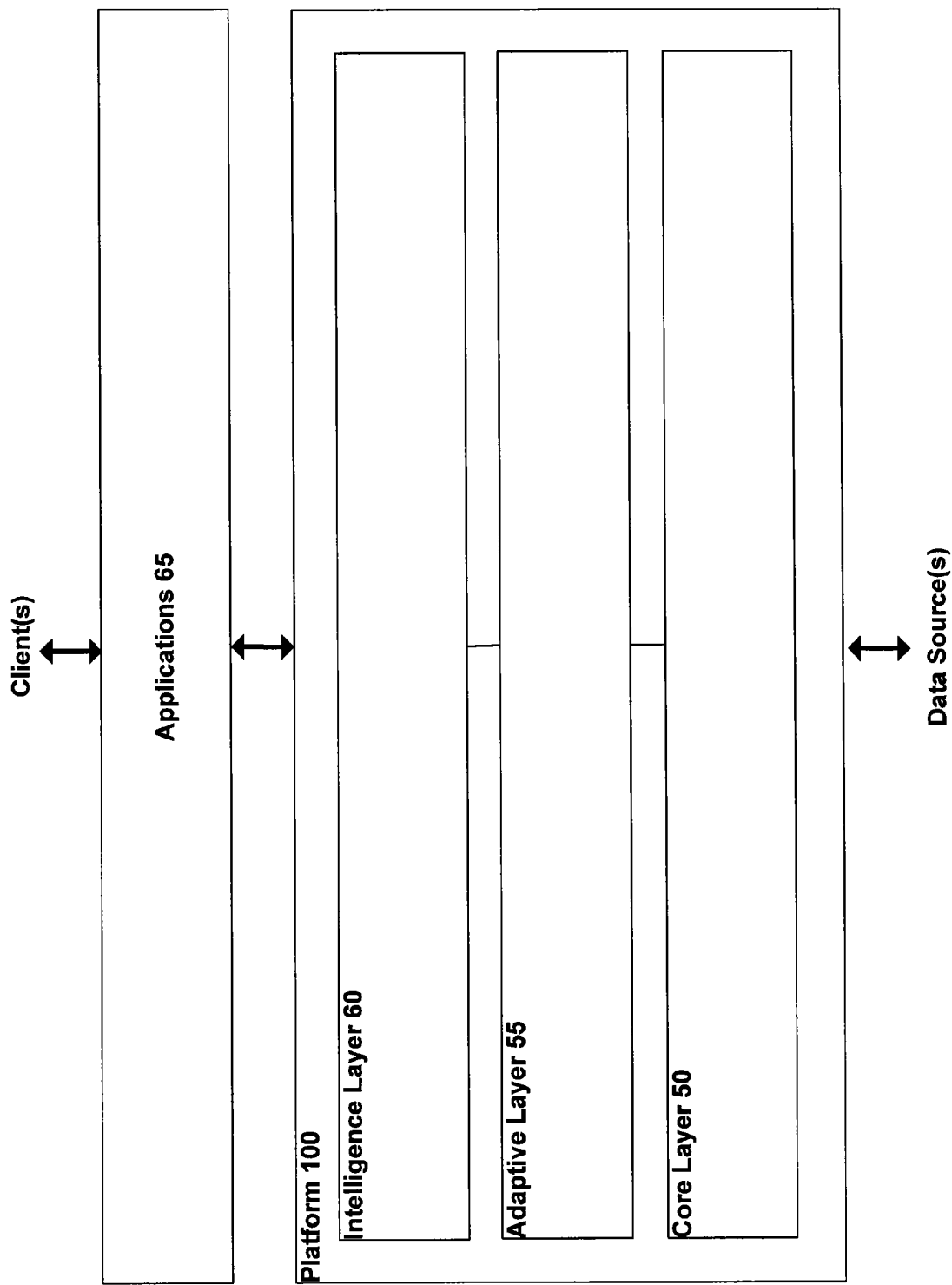
FIG. 2 illustrates a schematic diagram of components of a data handling platform 100 according to an embodiment of the present invention.

FIG. 2 illustrates a schematic diagram of components of a data handling platform 100 according to an embodiment of the present invention. FIG. 2 is intended to depict a variety of possible components of the platform, it is to be understood that all components will not be present in all embodiments. Embodiments of a data handling platform 100 may conceptually be viewed as having a variety of layers—an intelligence layer 60, adaptive layer 55, and core layer 50, for example. The layers 50, 55, and 60 are conceptual and are intended to illustrate levels of abstraction in data handling to facilitate communication between and among one or more clients and one or more data sources, as will be described further below. The layers 50, 55, and 60 are not intended solely to indicate physical divisions between computing devices configured to perform the described functionalities, although in some embodiments the layers may be physically divided, while in others a single computing device may be configured to perform all the described functionalities.

Generally, then, the layers 50, 55, 60 represent a conceptual distance from a data source in that the components depicted in the core layer 50 are process data that is closer to raw data stored in one or more data sources (not shown). These components—such as data, messaging, security and management, in some embodiments manipulate raw data to abstract, communicate, apply security or manage the data. The adaptive layer 55 may provide some context to the data, providing and manipulating information concerning, for example, preferences, context, and rules and interaction. The intelligence layer 60 may further add information to enrich the context of the data or transactions involving data. For example, the intelligence layer 60 may generate knowledge based on the data manipulated by the core layer 50 and context-enriched by the adaptive layer 55. The intelligence layer 60 may uncover or recognize patterns or relationships in the data, or infer additional information about the data based in some examples on both the data and the context or preferences provided by the adaptive layer 55. Any of a variety of intelligence modules may be used to impart a variety of different types of intelligence to the data gathered and processed by the core layer 50 and context-enriched by the adaptive layer 55. Finally, any of a variety of applications 65 may be written and implemented on any suitable computing device to put the functionality provided by the platform 100 to one or more specific end uses. Donation functionality and point of service applications, for example, will be described further below. Other applications may be implemented in other embodiments.

Figure 3:
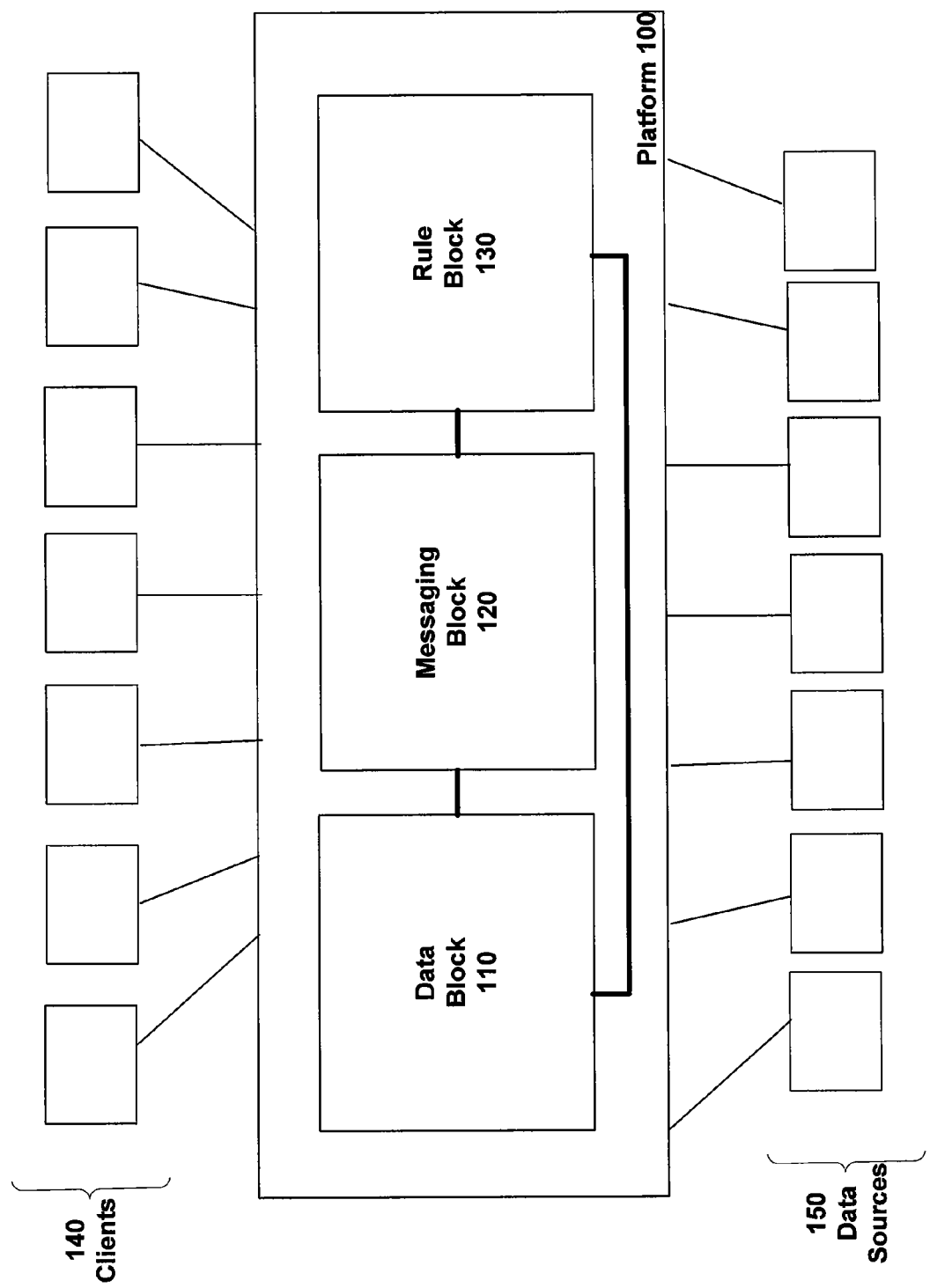
FIG. 3 is a schematic diagram of a platform according to an embodiment of the present invention.

FIG. 3 is a schematic illustration of a platform 100 according to an embodiment of the present invention. The platform 100 generally facilitates interaction between one or more data sources 150, and one or more clients 140. Although shown as unassociated in FIG. 3, some of the data sources 140 may be associated with one or more of the clients 150. That is one or more of the clients 150 may host one or more of the data sources 140 and the hosted data source available to the platform 100 through the hosting client. The data sources 150 may generally be of any type, including, but not limited to, databases such as Oracle, SQL server, XML, binary files, and various in-memory structures. The data sources 150 may be connected to the platform 100 through any available communication means, and may not be physically co-located with the platform 100. Similarly, the clients 140 may not be physically co-located with the platform 100 and may be in communication with the platform 100 through any available communication mechanism. A variety of clients 140 may be in communication with the platform 100 including, but not limited to, computers, cell phones, personal digital assistants, kiosks, or set top boxes, navigation devices or televisions.

As will be described further below, the platform 100 generally represents an architecture that can implement a rule-based expert system. The platform 100 communicates, stores, and manipulates data in a generic way such that any number of clients and data sources may be added, deleted, or changed. The platform 100 may be implemented by one or more computing devices with sufficient memory and software to implement the functionalities described. The platform 100 includes three components: a data block 110, a messaging block 120, and a rule block 130. Although all three components are shown in the platform 100, in some embodiments one or more of the blocks may not be implemented. Each of the 'blocks' 110, 120, and 130 generally include one or more processors and associated memory storing encoded software sufficient to perform the described functionalities. One or more of the blocks 110, 120 and 130 may utilize a same processor and memory in some embodiments. Each of the three blocks 110, 120, and 130 may be implemented by the same, or by different, processors. The three blocks 110, 120, and 130 may be in communication with each other and communicate as generally described below.

Data Block

Figure 4:
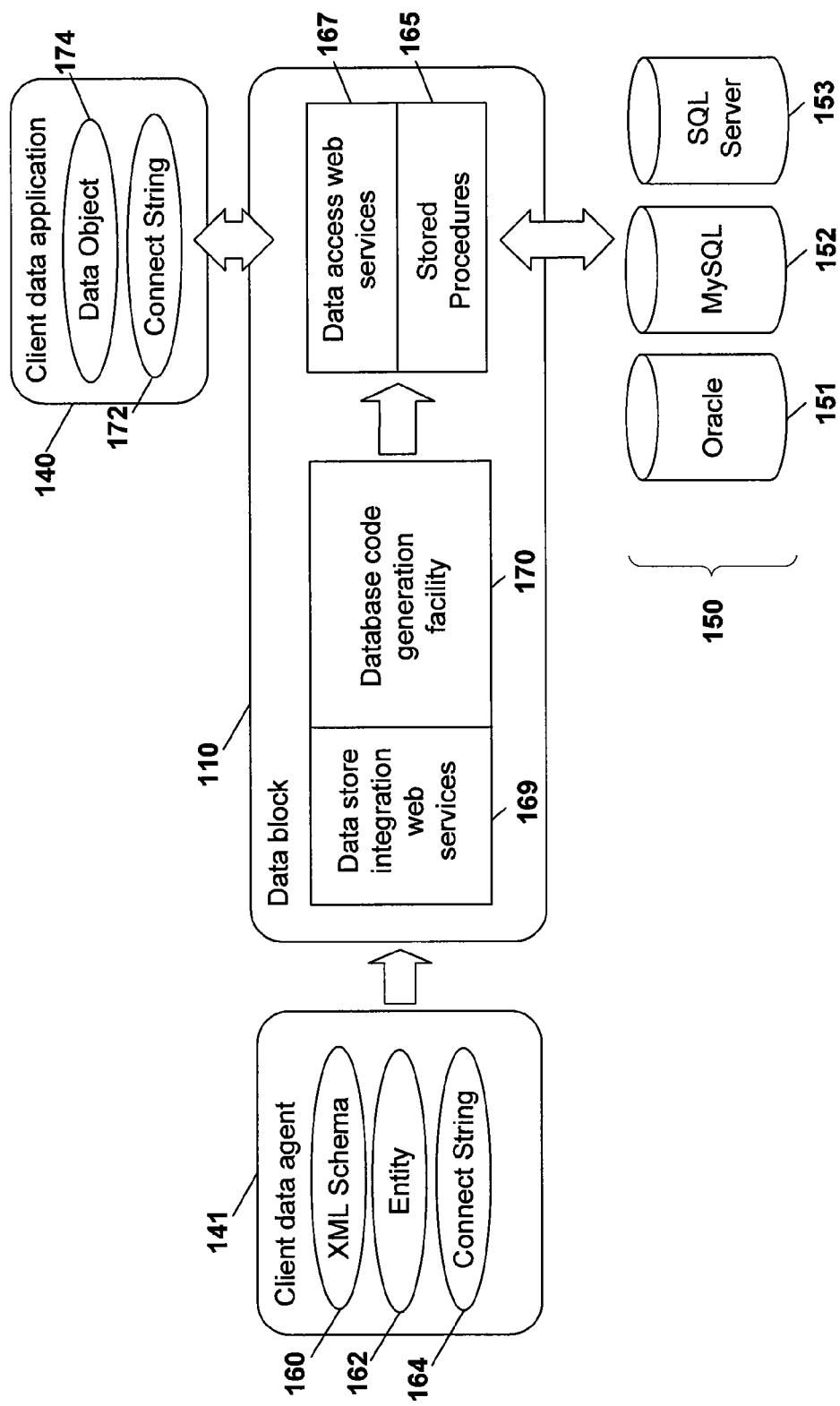
FIG. 4 is a schematic diagram of a system including a data block according to an embodiment of the present invention.

The data block 110 generally provides a set of functionality for bringing databases online in a dynamic manner after system initialization, and interacting with those databases. The data block 110 may utilize web services to interface with functionality encapsulated in stored procedures. FIG. 4 is a schematic illustration of am example of the data block 110. A client data agent 141 may communicate with the data block 110 to generate one or more tables in one or more of the databases 150. The client data agent 141 accordingly communicates an XML schema 160 to the data block 110. The XML schema 160 may be used to specify desired structure. As will be described further below, the XML schema 160 may describe desired data characteristics in a way that is generic to several database types. The data block 110 may accordingly receive the XML schema 160 and format the information from the XML schema 160 in a manner particular to the type of database for which it is destined. For example, the XML schema 160 may be designed to represent an entity 162, and the XML schema 160 may contain information about attributes of the entity 162 and instructions for and manipulating the entity 162. So, for example, the resultant table created in one of the databases 150 by the data block 110 may include create, read, update, delete (CRUD) functionality for each of the entities, such as the entity 162. The CRUD functionality may be created by the data block 110 automatically generating a set of stored procedures 165 for regulating interactions with the databases 150. A set of web services 167 and 169 are provided in the data block for interaction with the client data application 140, the client data agent 141, or both.

Accordingly, the data block 110 includes a database code generation facility at 170. The database code generation facility 170 functions to generate the explicit database code for one or more of the databases 150 corresponding to the desired database structures represented in the XML schema 160. Data store integration web services 169 are provided to interface with the client data agent 141. Data block 110 also includes the stored procedures 165 that may be used to manipulate data in one or more of the databases 150. In particular, the data block 110 may maintain a variety of functions for adding additional data sources, structures, or both, including but not limited to: create database, delete database, delete table for entity, create entity, delete entity, update entity, and read entity. Data access web services 167 are provided for communication with the client data application 140. In this manner, a flexible web services interface for clients is provided to the data block 110. By generating database code and storing procedures within the data block 110, the specifics of the databases 150 may be transparent to the clients 140. Accordingly any of the individual databases 151, 152, and 153 may be changed, or new databases added, or one or more databases removed, without requiring any change to the clients 140. Communication between the data block 110 and the databases 150 may occur in any manner. In some embodiments, a traditional configuration file is not used to store connection strings communicated from the clients 140, such as the connection strings 172 and 164. Instead, the data block 110 uses SOAP messages to interact with the databases 150. The connections may be specified in SOAP headers, which may be secure SOAP headers in some embodiments.

Figure 5:
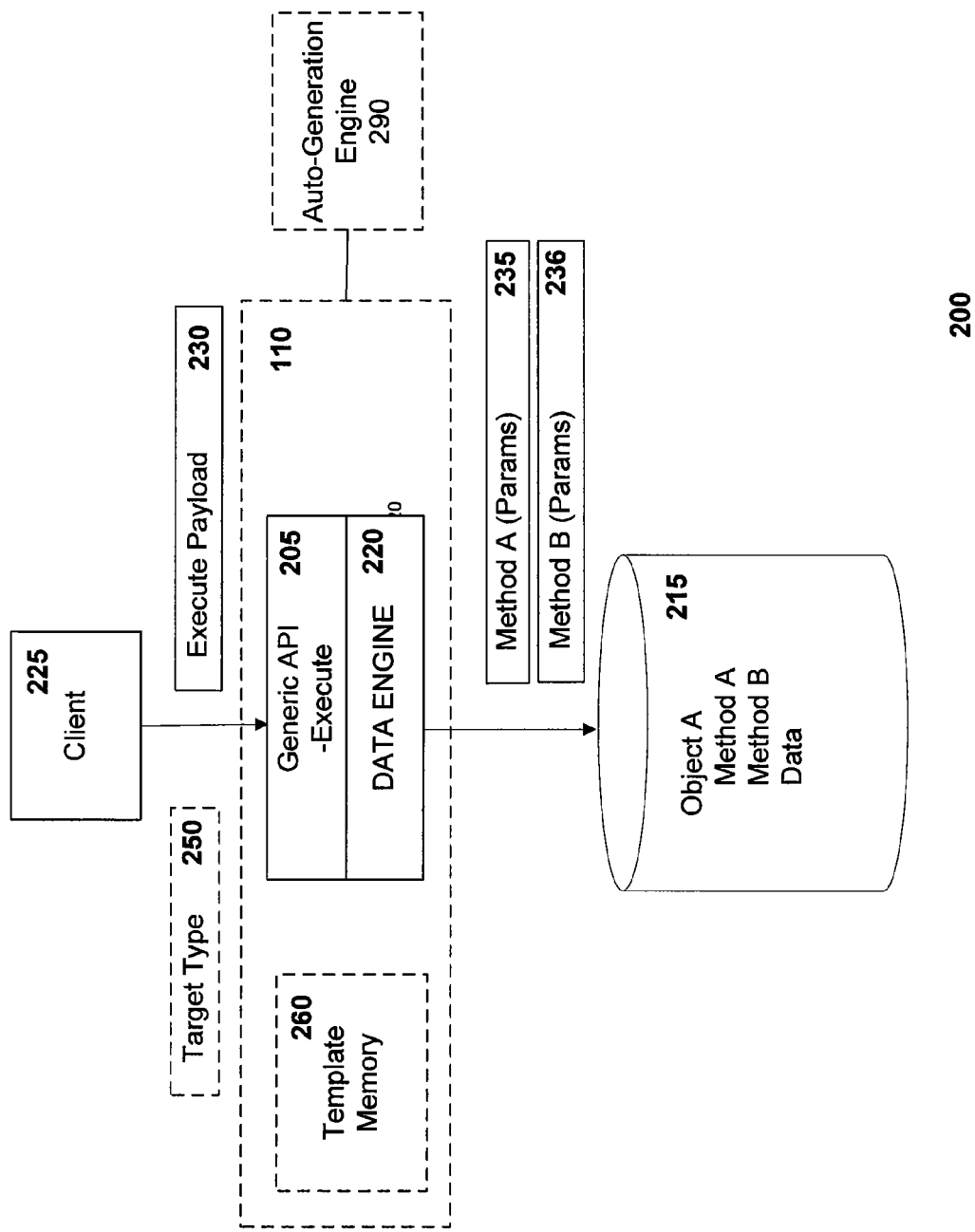
FIG. 5 is a schematic diagram of a system implementing a method for database communication according to an embodiment of the present invention.

A system 200 implementing an example of a data block 110 according to an embodiment of the present invention is shown in FIG. 5. A generic API creates an interface between a client 225 and a data source, such as a database 215. A data engine 220 processes messages received by the generic API 205 into function calls for the database 215. The generic API 205 supports its own abstracted set of commands, such as 'Execute' as shown in FIG. 5, as will be described in further detail below. A client 225 sends a message 230 containing a command supported by the API 205 ('Execute' as shown in FIG. 3) and a payload. The payload will be described further below but generally contains an XML schema including one or more references to a specific method supported by the database 215. The data engine 220 processes the message 230 and generates function calls 235, 236 for the database 215. In this manner, if the methods of database 215 change, or database 215 itself is swapped out for a different database having different methods, the generic API 205 does not need to be altered or recompiled in any way. Instead, the client 225 may assemble a different payload for the message 230 as appropriate.

When the database 215 responds to the function call, the data engine 220 may format the response in a manner usable by any programming language able to receive a response from the data engine 220. When the data engine 220 is implemented as a web-service, for example, the data engine 220 will be able to communicate a response to any client 225 capable of receiving a web service response. For example, the data engine 220 may format a response as a serialized version of an XML schema that can be de-serialized in any client and programming language that can manipulate XML. Information regarding exceptions and errors may also be included in the returned XML schema response.

An example of a code portion used to implement the generic API 205 may include a generic statement such as:
    object ExecuteMethod (string Payload)

This statement indicates the generic API expects an object returned and will perform an ExecuteMethod procedure using a passed-in payload, which will be of a string type and are described further below. The returned object may be a serialized form of an XML schema instance, for example.

The generic API 205 may support other methods that are generally variations of ExecuteMethod. Other methods may call into ExecuteMethod. The other methods may be specifically for different types of return data. Return data types may include those specified by ADO.NET, a suite of data access technologies included in the Microsoft .NET Framework. ADO.NET specifies a variety of possible return types including DataSet, Scalar, XML, DataReader, and None. The generic API 205 may support functions for each of these return types.

The generic API 205 may be implemented as a web service such that the client 225, or multiple clients (not shown in FIG. 5), can communicate with the generic API 205 from a remote location using http and SOAP protocols. SOAP (Simple Object Access Protocol) is an XML-based protocol for exchanging information and is generic and modular. Accordingly, SOAP may be advantageous when the message 230 communicated with the generic API 205 includes XML, as will be described further below.

The generic API 205 as well as the data engine 220, which will be described further below, may be implemented using any programming language, including any language that supports the implementation of web services, including but not limited to C#, VB.NET, C++, and Java.

Referring back to FIG. 5, the client 225 develops a payload for transmission to the generic API 205. The client 225 may be a human operator in some embodiments, while in other embodiments the client 225 is another computer process which generates the message 230 including the payload. While only one client is shown in FIG. 5, any number may be passing messages to the generic API 205, simultaneously or at different times. Since the generic API 205 supports a generic execute command, such as "ExecuteMethod" in the code portion above, specific methods to be accessed within the database 215 are provided in the payload. The payload should include the names of the methods to be called and any necessary parameters for calling the methods. The payload is formatted in a manner such that the data engine can process the payload and format the information contained in the payload into the function calls 235 and 236, for example, for the database 215.

A schematic illustration of an embodiment of a payload 300 is shown in FIG. 6. The schema payload includes a reference to MethodA at payload element 355 and reference to MethodB at payload element 360. MethodA includes references to Parameter1 and Parameter2 at elements 357 and 359. A trigger indicator referenced in element 358 indicates an end of the parameters for MethodA. The Parameter1 and Parameter2 references have associated metadata including type attributes referenced in elements 361, 363 and values referenced in elements 365, 367. Metadata is information about data and includes the type attributes described. Metadata may also include other information about data. Accordingly, other metadata, such as a direction attribute, may be included in other embodiments, and some attributes may not be included in other embodiments of schema payloads. For example, one or more parameters may be associated with a method in a schema payload that indicates an anticipated return type of the method. The return type parameter will not have a value associated with it.

MethodB includes Parameter3 referenced in element 370 having type and value, referenced in elements 372 and 374, respectively. Trigger indicator referenced in elements 376 indicates an end of the parameters for MethodB. Any number of methods may generally be referenced in a schema payload, and multiple instances of a same method may be included as well. The payload 300 may be implemented as an XML schema and coded accordingly. The trigger indicators 358 and 376 may be implemented by, for example, the end method tags of an XML schema, where element 355, a start of a method reference may be implemented by a <method> tag and trigger indicator 358 implemented as an </method> tag.

An example of an XML schema that may be utilized as the payload 300 to implement a "GetCustomer" method using an order number and a purchase date is as follows:

```
<Method Name = "GetCustomer">
    <Parameter Name= "OrderNumber" Type= "int" Direction= "In">
    123
</Parameter>
    <Parameter Name= "PurchaseDate" Type= "DateTime"> 2005-03-18
</Parameter>
    <Parameter Name= "Return" Type= "int" Direction= "out">
    </Parameter>
    </Method>
```

The above XML schema payload specifies a method GetCustomer containing parameters OrderNumber and PurchaseDate. The OrderNumber parameter in the schema above is of an integer type. The Direction parameter indicates the parameter passed in has meaning for the call into the API (not the return). In the above example, '123' is the order number being passed in. The PurchaseDate parameter in the schema above is of the type DateTime, and the date 2005 Mar. 18 is being passed to the API. The parameter Return in the example schema above indicates that a return type of integer is expected. </Method> is a trigger indicator indicating an end of the information associated with that method.

Referring back again to FIG. 5, once the payload is received by the generic API 205, the data engine 220 processes the payload to formulate specific function calls 235, 236 for the database 215.

Figure 7:
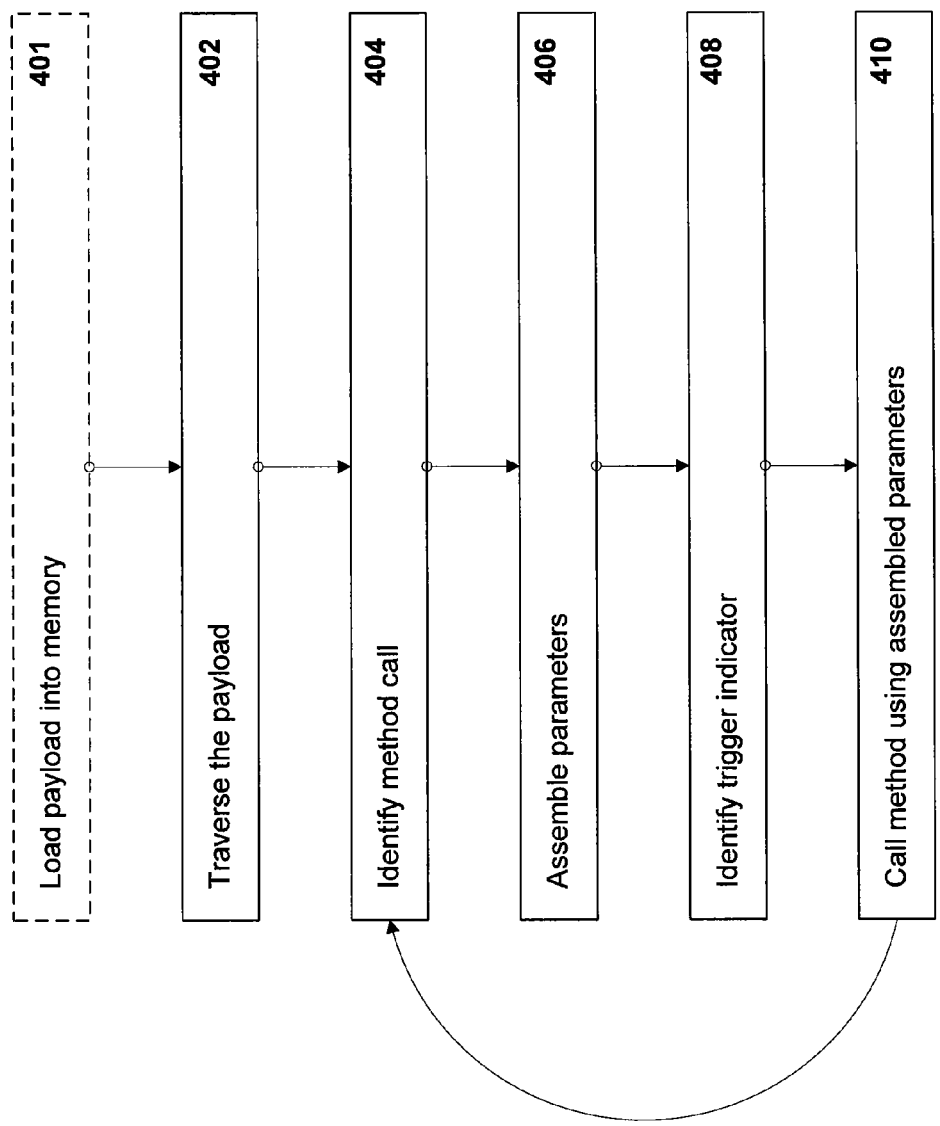
FIG. 7 is a schematic flowchart of a method for processing a payload according to an embodiment of the present invention.

An embodiment of a method 400 for operation of the data engine to process the payload 300 is shown in FIG. 7. The payload 300 may be loaded 401 into memory for faster access if desired. In some embodiments, only a portion of the payload is loaded into memory accessible to the data engine, and that portion is traversed. The data engine then traverses 402 the payload by loading a portion of the payload into memory and processing the portion in memory. As the traversing proceeds, a next portion of the payload may be loaded into memory for traversal, and so on, until the entire payload has been traversed. The data engine can implement a MemoryStream function to examine the payload from memory. The processed portion is then offloaded, and the next portion of the payload may be loaded into memory and processed. In other embodiments, the payload may be parsed by the data engine. The data engine parses the payload by validating the entire payload and loading it all into memory.

Traversing rather than parsing can increase the performance of the data engine 220. In one embodiment where the data engine 220 is implemented in a Microsoft NET Framework, the data engine 220 uses an XMLTextReader to traverse 402 the payload. The traversing operation may not perform data validation typically done when reading XML, and does not parse the XML types as it goes, they are simply read.

As the payload is traversed 402, the data engine 220 identifies 404 the start of a method call, such as MethodA 355 in FIG. 6. In some embodiments, the actual name of the method call is passed in, such as MethodA 355 and the data engine 220 will utilize this name in the function call 235 in FIG. 5 for the database. However, in other embodiments only a portion of a name of the method call is passed and the data engine 220 may reformat the name contained in element 355 of FIG. 6 into an actual function call supported by the database by, for example, adding suffixes or other characters, as will be described further below. Information regarding how to reformat the name in element 355 into a function call name may be included in a data template, described further below.

Once the start of the method call is identified, the data engine 220 assembles 406 parameters associated with the method call. Referring back to FIG. 6, for example, Parameter1 along with its metadata is unpacked from the payload 300 and stored as a properly formatted parameter for a function call. When traversing an XML schema, for example, a stored parameter may be generated for each portion of the XML schema following the method indication. The properly formatted parameter may be temporarily stored as objects. As described further below, the stored parameters are communicated to the database, and then they may be discarded. In some embodiments, the data engine may check the stored parameters to determine if the parameters are complete, and if a parameter is missing an element, or if the method name is faulty, the information related to the faulty method or parameter in the payload may be discarded or skipped.

As the data engine continues to process the payload, a trigger indicator is then identified 408, such as the indicator 358 in FIG. 6. Once the trigger indicator is identified, the data engine 220 calls 410 the identified method using the parameters assembled 406. The data engine 220 then identifies 404 a next method call in the payload, and the process shown in FIG. 7 may repeat.

Structurally, embodiments of the data engine 220, shown in FIG. 5, may include a processor coupled to a computer-readable medium containing executable code causing the processor to perform any or all of the actions shown in FIG. 7 and described with reference to FIGS. 4-6. The data engine 220 may be implemented in software, hardware or combinations thereof. Embodiments of the data engine 220 may be implemented as a web service and accessed using http, including the use of SOAP transport for communicating XML. The processor implementing the data engine 220 may be the same as that implementing the generic API 205 in some embodiments.

Figure 1:
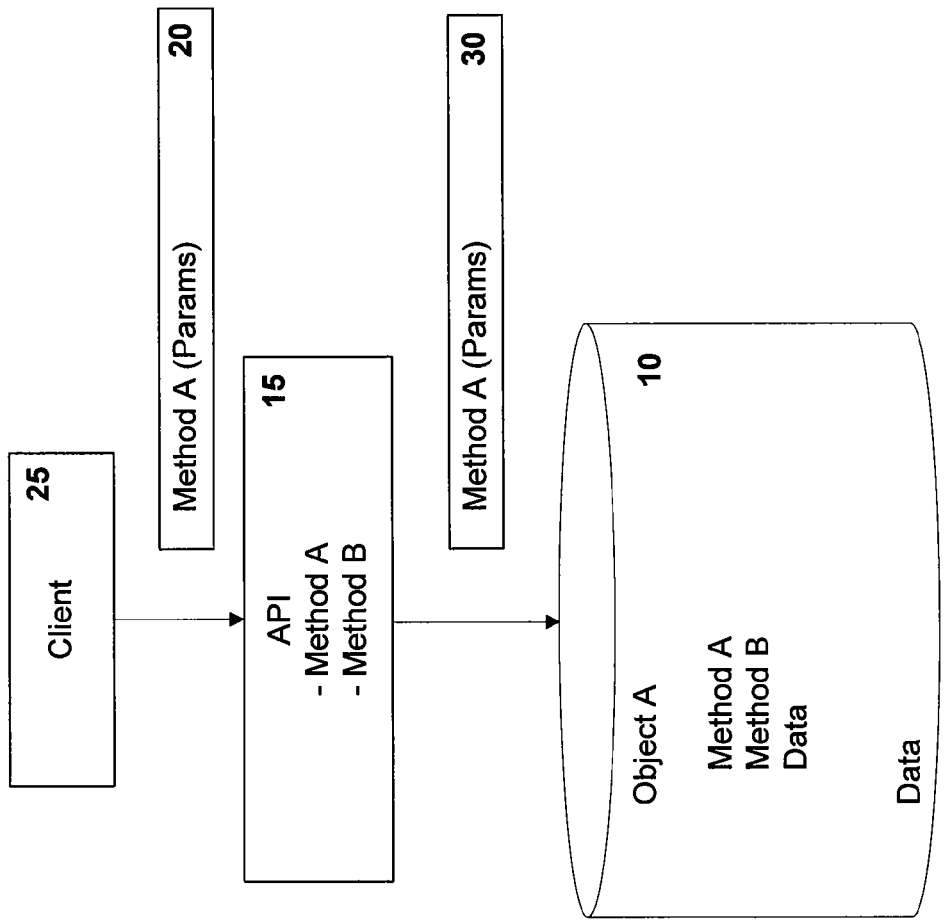
FIG. 1 is a schematic diagram of database communication according to the prior art.

Accordingly, the above description has provided an explanation of how a data engine may support a generic API to receive messages including a payload and process the payload into one or more specific function calls to a database. By providing a generic API, the generic API need not be recompiled or rewritten when one or more client entities want to communicate new or different calls to the API. However, as described above with reference to FIG. 1, existing APIs are coded to format function calls in a particular language depending on the type of database for which the call is destined—such as Oracle, SQL, or the like. The data engine 220 may also provide functionality to flexibly format function calls for any of a variety of databases as will now be described. In this manner, the generic API 205 also need not be recompiled or rewritten if the type of target database changes.

When a data engine receives a payload destined to apply to a certain type of target database, the data engine can formulate the method calls to the target database in a manner specific to the type of the target database. Database types may include, for example, Oracle, SQL, or any other database type or format. To do this, the data engine should receive an indication of the target entity. With reference to FIG. 5, an indication of a target database type 250 may be communicated by the client 225 to the data engine 220. The data engine 220 may receive the target type indication 250 in a variety of ways. In one embodiment, the data engine 220 identifies the type of database by reading a configuration file accessible to the data engine. For example, when the data engine is implemented as a web service, a connection string to any OLEDB (Object Linking and Embedding Database), including Oracle and SQL, may be used as a web.config setting. The data engine web service could then read the web.config setting at each call, or at other periods in some embodiments. In some embodiments, the data engine determines the target database type by referencing the configuration file on a default basis. That is, if no other target database indication is provided, the data engine may use the target database type specified in a configuration file accessible to the data engine.

In other embodiments, the indicator 250 of the target database type is transmitted in parallel with the message 230. When the client 225 communicates with the data engine 220 over http, a SOAP header may be used to pass the indicator 250. The SOAP header can be inspected on a call-by-call basis. The SOAP header may be prepared using a connection string in a configuration file residing with the client 225. The data engine may inspect the SOAP header to determine the type of the target database on every call, in some embodiments or periodically according to the particular implementation and use of the data engine.

When the type of database to be involved changes, the client 225 can change the indicator 250 or transmit a new indicator 250 without changing the message 230 or the process of communicating the payload. The SOAP header or configuration file is simply updated to indicate the new or different target database. The data engine 220 uses the target type indicator 250 to change the way data unpacked from the message 230 is formatted into individual calls 235, 236 to the target database. Thus, formulating a request to a new or different database type does not require recompilation of any code within the data engine. The type of target can thus be changed without changing the payload or re-compiling the generic API executed by the data engine. A new template may simply be used, as described further below, that allows the data engine 220 to format the call in a manner appropriate for the new target type.

To facilitate formatting function calls in accordance with any of a variety of possible database types, as indicated by the target type 250, templates are provided in a template memory 260 in communication with the data engine 220. The template memory 260 may be integral with a computing system used to implement the data engine 220, or may be a separate data storage subsystem. The template memory 260 contains templates describing how method calls are formatted for each of a variety of database types. In some embodiments, the template further describes how data may be manipulated within each database (for example, create, read, update, delete and other operations). The data template may describe how each operation maps into specific commands for the target database type. Data templates may be implemented as XML schemas. In some embodiments, the data templates advantageously require a small amount of memory such that they are able to be stored in cache memory. Of course, the size of the cache memory will be dependent on the availability and cost of the memory. As an example of the size of a data template, in some embodiments, a data template suitable to prepare messages for a SQL server is less than 4 kilobytes.

Any number of data templates may be provided, with typically one data template per database type with which the data engine may have to access or communicate. In some embodiments where certain functions of different database types are identical, the database types may share a single data template. Data templates may be deleted when a certain database type is no longer needed or desired. Data templates may be added when a database type is added or anticipated. Accordingly, when a destination database type changes, or a new database is added, a new template may simply be added to the template memory 260 without a need to recompile the generic API 205 or change the operation of the data engine 220.

Figure 8:
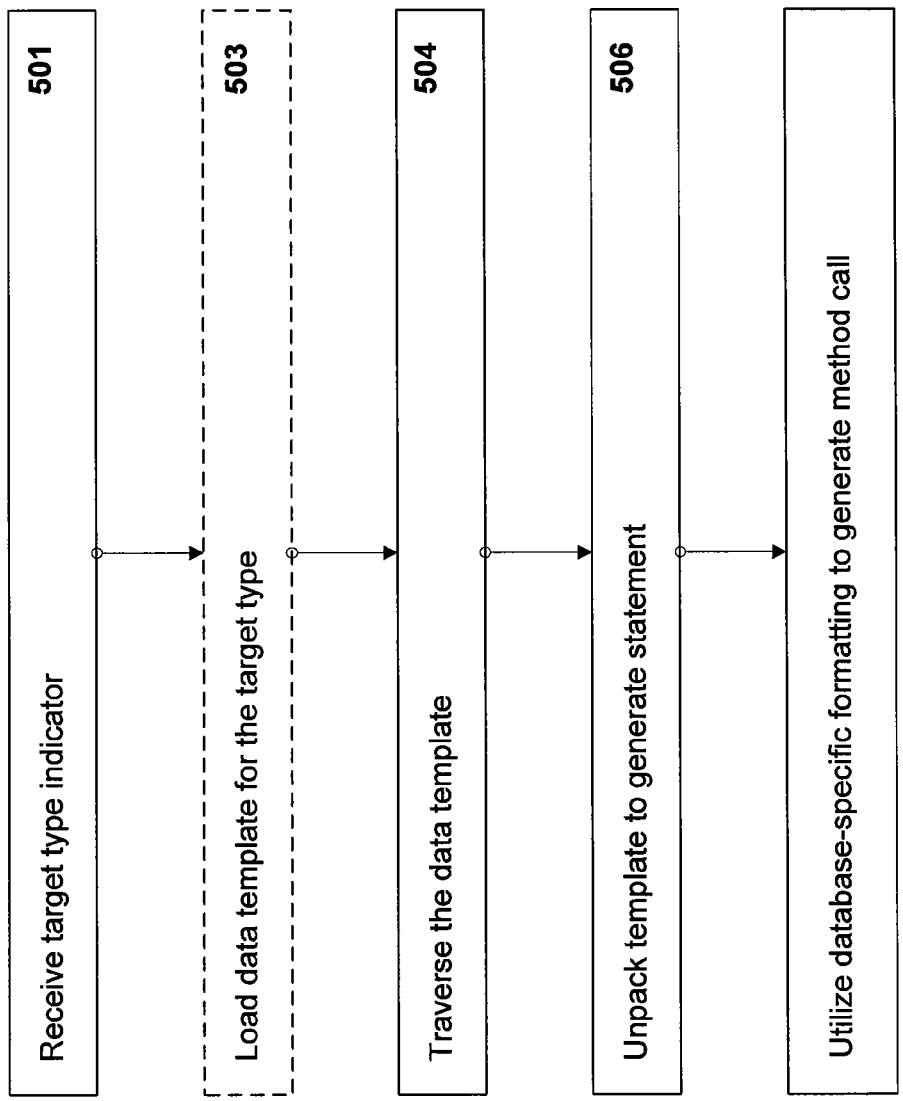
FIG. 8 is a schematic flowchart of a method for formatting a call for a specific database type according to an embodiment of the present invention.

An embodiment of a method 500 implemented by the data engine 220 to generate a function call is schematically depicted in FIG. 8. The data engine receives 501 an indicator of the target type, as described above. The data engine may then load 503 a data template corresponding to the target type into a cache or other accessible memory for faster access. If the data template has already been loaded due to a pre-loading procedure or recent use, for example, the data template need not be reloaded. Alternatively, the data engine could access the data template at a remote location without loading the template into the cache.

The data engine then traverses 504 the data template, to unpack the template 506 and generate statements specialized to the database type. The statements 506 are then used by the data engine in combination with data received in the payload, described above, to generate a method call for the database, as generally described above with reference to FIG. 7. That is, with reference to FIG. 7, once the data engine has identified a method call and assembled parameters from a payload, the data engine may utilize database specific statements generated from a data template to generate an appropriate method name for the target database and format parameters for the target database. So, for a single input payload, the data engine could generate any of a variety of statements, based on the data template used to format the information extracted from the payload.

Accordingly, embodiments of data engines and generic APIs have been described above that allow flexible communication with a variety of databases. Any method call may be handled by the generic API without recompilation, at least in part because the data engine extracts specific method names from a payload. Additionally, the payload may be formatted for any destination database type in accordance with data templates. Embodiments of data engines according to the present invention may provide functionality beyond the formatting of method calls, however, to include an auto-generation functionality. The data engine itself may perform the auto-generation functionality in some embodiments, or a separate auto-generation engine may be provided operating on a same or different processor than the data engine.

As known, databases may contain various database-specific objects that impart additional functionality to the database. An API specific to the database type has been traditionally required to access or utilize these database-specific objects and a database administrator was typically required in prior systems to generate new objects in a target database. However, an embodiment of an auto-generation engine according to the present invention may generate data templates for any database object, allowing their use by the data engine as described above. Additionally, using embodiments of a data engine and auto-generation engine, such as the auto-generation engine 290 in FIG. 5, objects may be automatically generated in a target database, including tables, procedures, indices and triggers. In this manner, new objects and entities can be supported without specific database administrator intervention.

Figure 9:
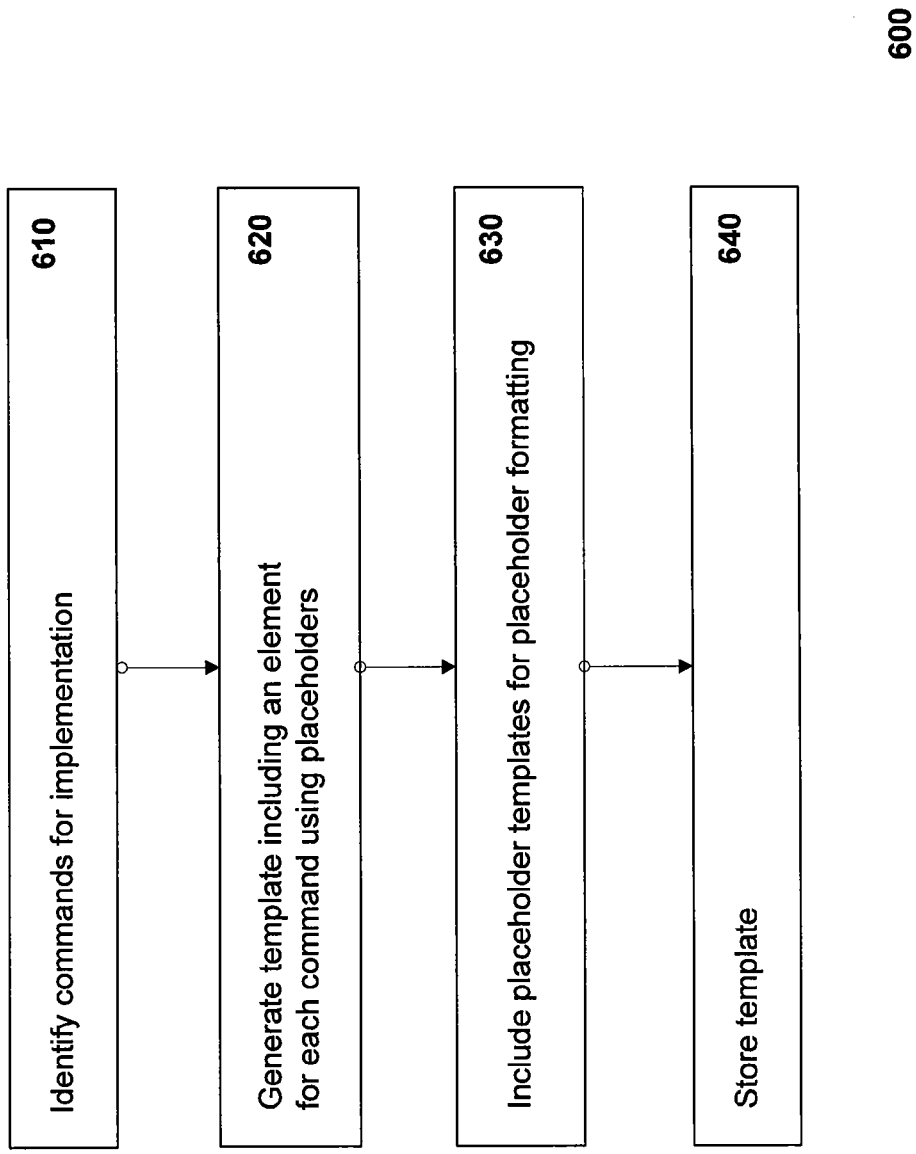
FIG. 9 is a schematic diagram of a method for creating templates according to an embodiment of the present invention.

To facilitate auto-generation functionality, one or more database templates for the implementation of commands in a target database are generated. These templates describing command implementations may be XML schemas and may be stored in the template memory 260 in FIG. 5. Alternatively, the templates may be stored in one or more target databases or other content-management system. An embodiment of a method 600 for creating a template for database commands is shown in FIG. 9. One or more commands are identified for implementation 610. Generally, any command supported in an API may be manipulated according to the method 600 of FIG. 9 by analyzing the command, identifying and retaining static content and replacing variables with placeholders. Accordingly, to identify commands 610, commands of interest are selected from a particular API. For example, some database types (such as Oracle) support various APIs or versions of a database engine, and some (such as SQL) support various language syntaxes. Generally, any API and/or syntax may be supported according to embodiments of the present invention. The particular commands identified 610 may include, for example, create, insert, retrieve, select, update, procedure, trigger, index, function, getmail, sendmail, and the like.

A template is then be generated 620. The template may be an XML schema including an element for each command identified. Any XML editor or other program may be used to generate the statement template, such as Visual Studio XML Schema Editor or XMLSpy. Each command identified 610 will be included as an element in the template. An example of a database template 650 is shown in FIG. 10. A statement 655 of the template 650 includes a formatted command 660 with placeholders for the variable information. The statement 655 also includes a reference 665 to one or more placeholder templates describing how to format information to replace the placeholder contained in the formatted command 660. The database template 650 further includes a placeholder template 670. The placeholder template 670 includes a format 675 and a fieldmask 680 which together will describe how to generate a string using input data to replace the placeholders in the formatted command 660. Although only one statement 655 and placeholder template 670 are shown in FIG. 10, any number may be generated.

Once the template 650 is generated including elements for each desired command and elements for each placeholder, referring back to FIG. 9, the template is included for placeholder formatting 630 and then stored 640 in a location accessible to the auto-generation engine. The templates may be stored in the file system, or in some embodiments, in a database or a content-management system. The templates will be used subsequently as described below to generate objects within various target databases.

Once templates are generated as described above and with reference to FIGS. 8-9, a processing engine, such as the data engine 220 may utilize the template to generate structures in a target database. By utilizing the templates, a client or other transmitting entity can cause a structure or procedure to be stored in a database, without requiring knowledge of the particular syntax necessary to create the structure or procedure in the database.

Figure 11:
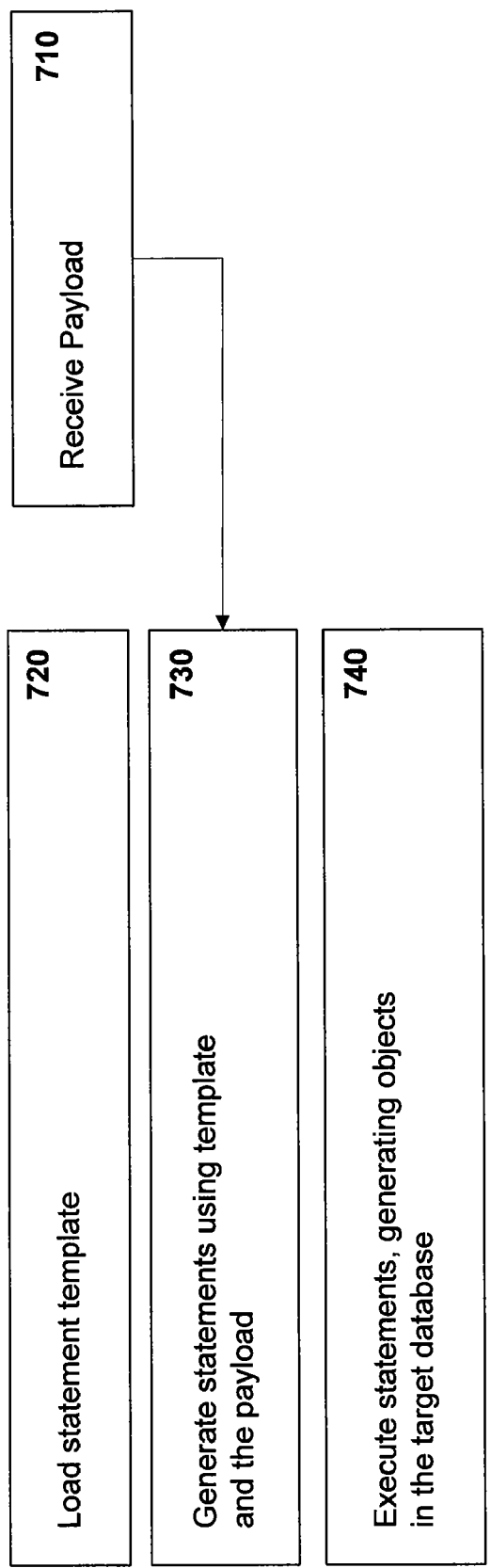
FIG. 11 is a schematic diagram of a method for auto-generating an object in a target database according to an embodiment of the present invention.
Figure 12:
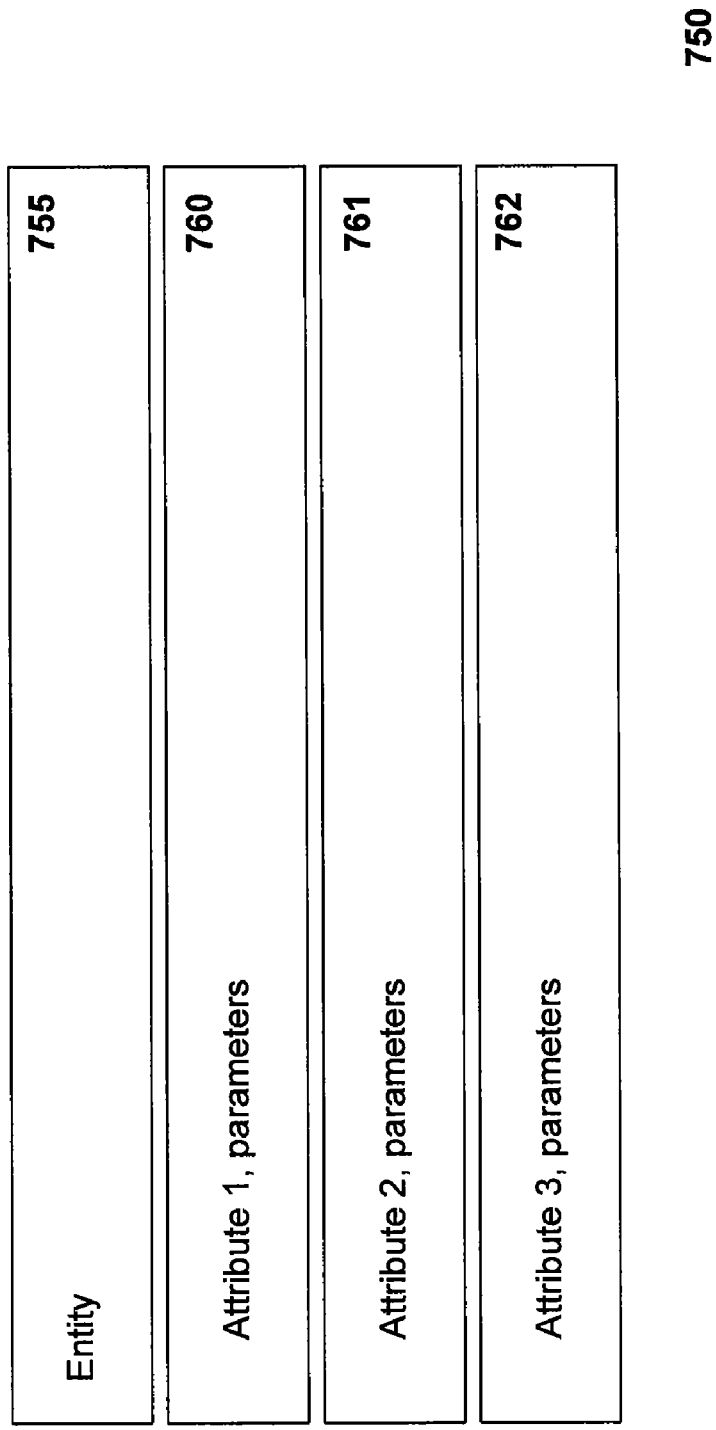
FIG. 12 is a schematic diagram of a payload according to an embodiment of the present invention.

Operation of an auto-generation engine is described with reference to FIG. 11, and a detailed example of one embodiment is provided below. A payload is received 710. The payload is similar to data payloads described above and depicted in FIG. 6, but contains different information. An example of a payload 750 is shown in FIG. 12. The payload 750 is an XML schema containing an entity name element 755 and a plurality of attribute elements 760-62 associated with the entity element 755. Each of the attribute elements 760-62 may include one or more parameters. Although only one entity element 755 is shown in the payload 750, a number of elements may be included, and each element may generally have any number of attributes.

Following a call into the generic API and the receipt of the payload 710 (FIG. 11), an appropriate database template is loaded 720 into memory. As described above with respect to the data engine and data templates, an indication of the target database type may be received in a variety of ways, for example by loading a web.config file or by inspecting SOAP headers. The template may be loaded from cache, or if not in cache, the template may be loaded from the file system or any other stored location, including a statement template repository which may be the same or different than the template memory 260 in FIG. 5. The auto-generation engine prepares completed statements 730 for execution by looping through the database template 650 of FIG. 10. Placeholders in the formatted statement 660 are replaced with information from the payload 750 of FIG. 12 as directed by the placeholder templates 670. Generally, the format element 675 of the placeholder template 670 provides a format, including any delimiting characters or other syntax. The fieldmask element 680 specifies which parameters of the attributes 760-762 from the payload 750 of FIG. 12 should be inserted into the format 675 and in which order. Parameters from each of the attributes 760-62 are formatted according to the placeholder template 670 and replace the placeholder in the formatted statement 660. Once all placeholders are replaced and the statement is complete, the statement is executed 740, referring back to FIG. 11, generating objects in the target database. The statement is executed in one embodiment by the processing capabilities of the target database. In another embodiment, the auto-generation engine executes the statements, generating the objects in the target database. For example, a table, procedure, email folder or PL SQL package may be stored in the target database in accordance with the executed statements. Once stored in the target database, the objects may be populated, called, or otherwise used by any process, including a data engine, as described above.

A detailed example of operation of an embodiment of an auto-generation engine is now described to aid understanding.

A XML schema used as a payload passed to the auto-generation engine may include:

```
<EntitySchema Entity="Provider" xmlns="http://tempuri.org/DBSchema.xsd">
    <Attribute Name="ProviderID" Type="uniqueidentifier" Size="" Null="NOT NULL" Default="DEFAULT (NEWID( ))" ID="0" Key="NonKey" />
    <Attribute Name="ProviderName" Type="nvarchar" Size="(50)" Null="NOT NULL"
```

-continued

```
Default="DEFAULT ('Name')" ID="1" Key="NonKey" />
    <Attribute Name="ProviderDescription" Type="nvarchar" Size="(255)" Null="NOT NULL" Default="DEFAULT ('Provider')" ID="2" Key="NonKey" />
    - <Constraint ConstraintString="" Type="PRIMARY KEY" TemplateID="9">
        <Format>,CONSTRAINT PK__ut{0} PRIMARY KEY CLUSTERED ({1})</Format>
        <AttributeID>0</AttributeID>
    </Constraint>
</EntitySchema>
```

The above payload is designed to trigger the creation of a "Provider" entity in a target database. The attributes of the "Provider" entity are "ProviderID, ProviderName and ProviderDescription." Each attribute has a variety of associated parameters, as listed in the payload.

A first statement in a database template used to process this payload may include:

```
<Statement HasConstraints="true" HasBusinessRule="false">
    <Format>create table ut{0} ({1} {2})</Format>
    <Attributes ID="0" AttributesString="" TemplateID="0" />
</Statement>
```

The formatted statement is "create table ut" with various placeholders indicated between the { } brackets. The first {0} placeholder is replaced with the entity name "Provider". The Attributes ID and TemplateID specifies how to process the attributes of the payload for insertion into the {1} placeholder. Here, the TemplateID 0 will be used to process the attributes.

TemplateID 0 may be contained as an element within the template and may include:

```
<Template ID="0" Sepparator=";">
    <Format>{0} {1}{2} {3} {4}</Format>
    <FieldsMask>:Name,Type,Size,Null,Default</FieldsMask>
</Template>
```

For each attribute, this template will be used to format the attribute's parameters by replacing the placeholder in the format statement with the payload information corresponding to the fieldsmask indicator. In the example above, for the ProviderID attribute, this would result in "ProviderID uniqueidentifier <Size not specified> NOT NULL DEFAULT NEWID( )". A similar string is generated for each attribute, and the collection of strings is used to replace the {1} value in the create table template statement, above.

A next statement in the template may be:

```
<Statement HasConstraints="false" HasBusinessRule="false">
    <Format>create procedure uspCreate{0} ({1}) AS INSERT INTO ut{0} ({2}) VALUES ({3})</Format>
    <Attributes ID="0" AttributesString="" TemplateID="1" />
    <Attributes ID="1" AttributesString="" TemplateID="2" />
    <Attributes ID="2" AttributesString="" TemplateID="3" />
</Statement>
```

The placeholder {0} is replaced with the entity name from the payload, "Provider", resulting in "create procedure uspCreateProvider". Then, the attributes (ProviderID, ProviderName, ProviderDescription) are processed according to TemplateID 1, as indicated by the Attributes ID line for insertion into the {1} placeholder. TemplateID 1 may include:

```
<Template ID="1" Sepparator=",">
<Format>@{0} {1}{2} {3}</Format>
<FieldsMask>:Name,Type,Size,Input</FieldsMask>
</Template>
```

This results in a string being generated for each attribute in the payload as described above. For ProviderID, the string would be "@ProviderID uniqueidentifier IN". The strings generated with each attribute are concatenated and inserted into the {1} placeholder. The next placeholder in the statement is processed according to Template ID 2 which may include:

```
<Template ID="2" Sepparator=",">
<Format>{0}</Format>
<FieldsMask>:Name</FieldsMask>
</Template>
```

The string generated for ProviderID would simply be "ProviderID". The string generated for each attribute is concatenated and inserted into placeholder {2}.

The attributes are then processed according to Template ID 3, which may include:

```
<Template ID="3" Sepparator=",">
<Format>@{0}</Format>
<FieldsMask>:Name</FieldsMask>
</Template>
```

The string generated for the Provider attribute would be "@Provider". Again, the strings for all the attributes are concatenated and inserted into the {3} placeholder. Ultimately, after replacing all placeholders the overall statement created will be:

create procedure uspCreateProvider (@ProviderID unigueidenfifier IN, @ProviderName nvarchar(50) IN, @ProviderDescription nvarchar(255) IN) AS INSERT INTO utProvider (ProviderID, ProviderName, ProviderDescription) VALUES (@Provider, @ProviderName, @ProviderDescription)

This statement can be executed to generate a procedure in a target database. This procedure may later be used by other engines or programs accessing the database. This alleviates the need for a database administrator to manually establish the procedure in the database. Once the information is passed to the API as a payload, the auto-generation engine automatically creates the appropriate procedure in an end database.

Figure 13:
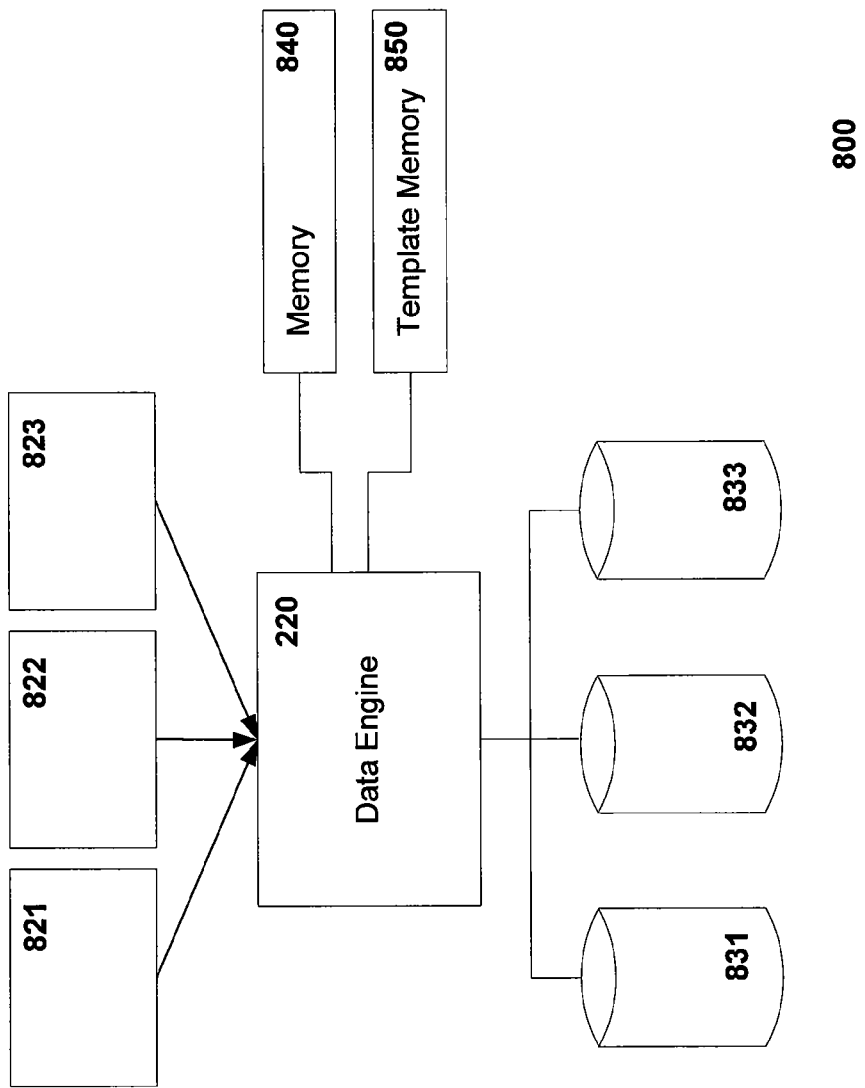
FIG. 13 is a schematic diagram of a system according to an embodiment of the present invention.

Embodiments of the present invention provide data handling platforms, which may be included in system 800 shown in FIG. 13 including or running an embodiment of a data engine 220 as described herein. The data engine 220 may include one or more processors or other computational cores that process requests received from any type of client, including clients 821, 822 and 823 in FIG. 13. The clients may include, for example, a user through a user interface, or some other process, program or machine transmitting information to the data engine 220. Any of the requesting entities 821, 822 and 823 may communicate with the data engine over any known means of communication, wired or wireless, electronic or optical. In some embodiments, the sending entity may communicate with the data engine over http and utilize SOAP headers, as described above. Embodiments of data engines described herein, such as data engine 220, may advantageously be implemented as a web service. Generally any programming language may be used, including any language that supports the implementation of web services, including but not limited to C#, VB.NET, C++, and Java. Implementing the data engine as a web service allows any transmitting or receiving entity to communicate with the data engine easily in a well-known, scalable manner. The data engine 220 is able to process incoming messages according to embodiments of methods described above with reference.

One instance of the data engine 220 is sufficient in some embodiments to service any number of sending entity requests to any number of available databases. Three available databases, 831, 832 and 833 are shown in FIG. 13. Of course, the number of clients, databases, and requests to be served is a function of the ultimate application of the system and speed of the processor(s) used by the data engine, as well as the speed of the communication interfaces. Embodiments of the data engine may generally be implemented to interface with any system-level software platforms including, but not limited to, Windows, Linux and Java. Memory 840, or other computer-readable medium, may be coupled to or form part of the data engine 220. The memory 840 may contain the executable code causing the data engine 220 to perform the various functions described herein. Further template memory 850 stores data templates as described above. The template memory 850 may be separate from the memory 840 or they may be combined. A cache (not shown) may also be coupled to the data engine for storing loaded templates from the template memory 850, although in some cases the cache may be included in the memory 840 or the template memory 850 itself.

As was described generally above with reference to FIG. 3, the data engine may be part of a larger data handling platform 100 in some embodiments—with other portions of the data handling platform provided to communicate messages, and take action on the data. To communicate with other components of the data handling platform 100, the data block 110 may be configured to publish messages to a shared message bus, as will be described further below, and may be subscribed to receive certain types of messages that may be published by other components or systems to a shared message bus. For example, in some examples, when the data block 110 stores a new data item, it may publish a message indicating that a new data item has been stored. Other systems or components that may need to take action based on that data item are subscribed to that type of message, and may be so notified by a messaging block, examples of which are described below.

Messaging Block

Examples of a data block have been described above that may facilitate interaction with one or more database types in a generic manner. That is, the data block provides the specific interaction with an end database. The client need not know, or provide software code specific to, the end database to be manipulated. Referring back to FIG. 3, the data block 110 may accordingly provide an interface between one or more of the clients 140 for placing data into one or more of the data sources 150. One or more of the clients 140 may want to communicate with one another, such as by calling software procedures that one or more of the clients 140 provides. As was generally described above, a typical software approach to hard coding interactions between one or more of the clients 140 may limit the ability of the system to change without requiring significant code rewrites. Accordingly, a message broker capable of calling methods independent of the syntax of the end system called may be used. The messaging block 120 may provide such a message broker functionality.

Figure 14:
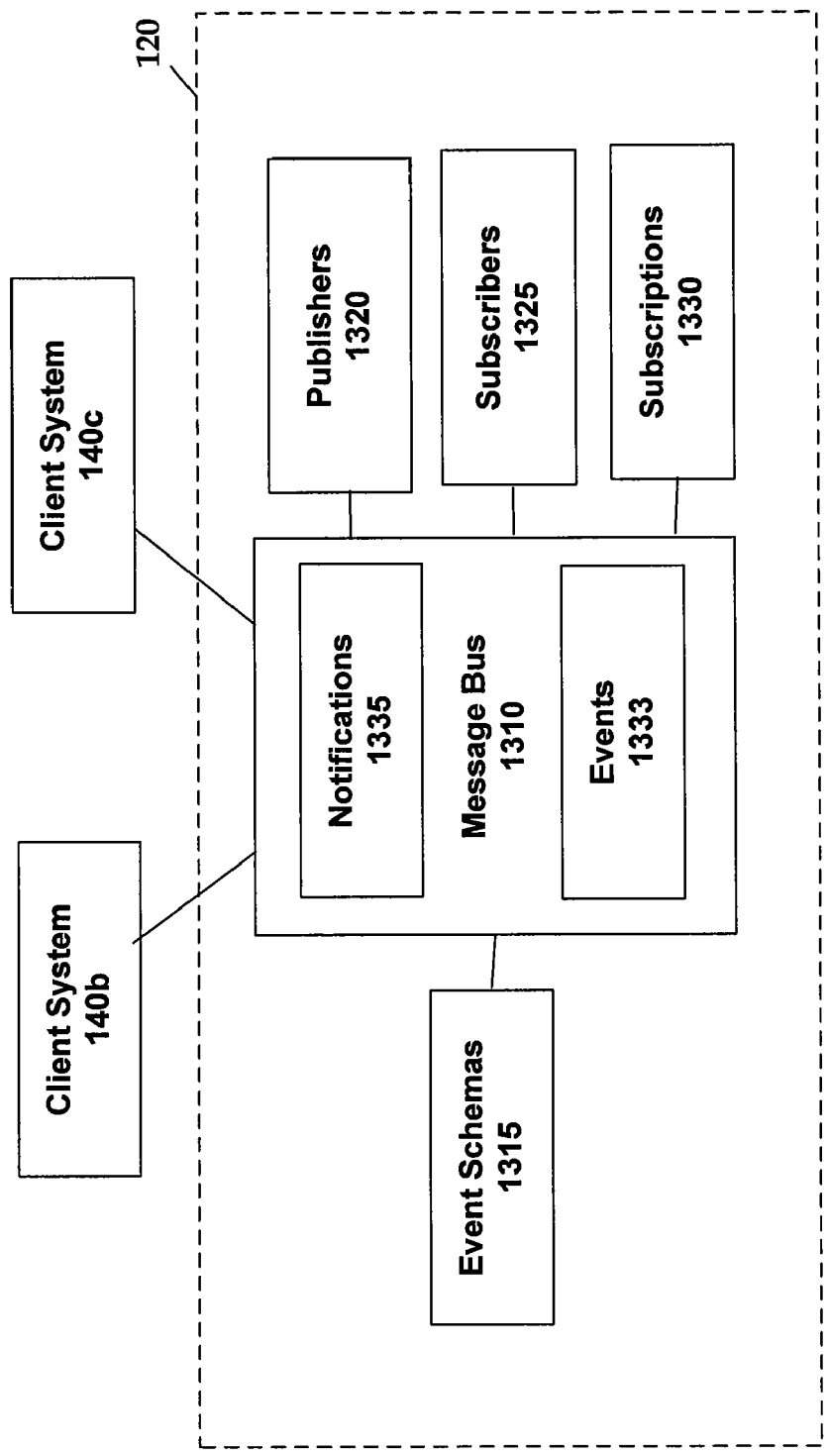
FIG. 14 is a schematic diagram of a messaging block according to an embodiment of the present invention.

FIG. 14 is a schematic illustration of a messaging block 120 according to an embodiment of the present invention. The messaging block 120 includes a message bus 1310. Generally, the message bus 1310 facilitates communication between one or more clients, such as the clients 140b and 140c by receiving messages, persisting messages, and reporting messages to interested subscribers. In this manner, communication is centralized and need not occur directly between the clients 140b and 140c. Rather, communication is routed through the message bus 1310. The message bus 1310 may include one or more processors for implementing the functionalities described. The message bus processors, as described above, may be shared in some embodiments with the data block 110 and the rule block 130. The message bus 1310 may further include memory for the storage of messages, as will be generally described below. The message bus 1310 may be implemented in some embodiments as an API performing the functionalities described.

Event schemas 1315 are stored in a memory accessible to or part of the message bus 1310. Each of the event schemas 1315 provides associated database infrastructure so messages received of the event type specified in the schema may be created and utilized by one or more publishers 1320. Each of the event schemas 1315 may accordingly come to be associated with one or more of the publishers 1320. The publishers 1320 are stored data structures representing a source of an event or message. So, for example, if the client 140b will be sending messages to the message bus 1310, the client 140b may establish one or more publishers 1320. Publishers 1320 may be stored in the form of XML arrays to facilitate the use of SOAP in embodiments of the present invention. A publisher may be notified by the message bus 1310 of responses to the publishing of an event. Accordingly, a uniform resource identifier (URI) or other mechanism for notifying a publisher may be stored.

Publishers may create a message by calling a publisher subscriber web service "CreateEvent". The web service may be implemented by the messaging block 120. An entry may be made in a specific event table related to an event schema. A trigger on the event table inserts data into a notification table that may include a time dispatched. The message bus 1310 may include a router that polls for the notifications 1335 and ensures that messages are dispatched in a timely fashion.

Subscribers 1325 are data structures containing information about a destination of a message or event. Similarly to publishers, 1320, each subscriber 1325 may include a uniform resource identifier (URI) or other mechanism for notifying a subscriber. For example, the URI for a subscriber may be a web page where a subscriber manages a plurality of subscriptions. So, for example, a client interested in receiving messages from the message bus 1310 may establish one or more subscribers 1325. Each of the subscribers 1325 may be subscribed to messages from one or more of the publishers 1320. Subscribers 1325 may be stored in the form of XML arrays to facilitate the use of SOAP. Accordingly, clients interested in passing messages to the message bus 1310 may establish one or more publishers 1320 capable of publishing events having a type corresponding to one or more of the event schemas 1315. Clients interested in receiving messages from the message bus 1310 may establish one or more subscribers 1325. A client may establish both publishers and subscribers to both send and receive messages.

To notify one or more subscribers 1325, a message bus router included in the message bus 1310 may call a notify function of an event notification web service. A notification URI may be overridden with a subscription URI for each event. In return, subscribers 1325 may call an acknowledgement web service to acknowledge receiving the message.

A message received from a publisher 1320 may be stored at the message bus 1310. The entire message may be stored, or in some embodiments, only events 1333 contained in the message are stored, as will be described further below. The message bus 1310 determines where to send the message based on subscriptions 1330. The subscriptions 1330 are data structures containing information about a subscription, that may refer back to a subscriber and a type of message the subscriber is interested in receiving, such as one or more of the event schemas 1315. Other information, such as a filtering mechanism, may also be included in the subscriptions 1330. The message bus 1310 may maintain the subscriptions 1330. Individual subscriptions may be added or deleted without altering or interrupting the general functionality of the message bus 1310. By adding a new subscription, or altering a subscription stored in the subscriptions 1330, the message bus 1310 will begin to route messages differently, without any of the code for the operation of the message bus 1310 having to be altered. By way of summary, the message bus 1310 receives a messages, stores at least part of the message, consults the subscriptions 1330 to determine which subscribers 1325 are interested in messages of the type received, and then generates notifications 1335 for the interested subscribers. Accordingly, while clients may be affected by the content of messages, they may pass messages only to and from the messaging block 120 in embodiments of the invention, and may not need to communicate with any other client directly. In some embodiments of the present invention clients may never communicate with other clients directly, and all communication may be routed through the messaging block 120.

By storing messages, or portions of messages, at the message bus 1310 and verifying notifications 1335, the message bus 1310 may ensure that communication is accurate and continuous. Furthermore, by storing the events 1333, scalability and fault tolerance of the system may be improved relative to a system where such information is not persisted. For example, storing messages may prevent or reduce the incidence of lost messages due to a failure of communication with a particular client. Instead, the message may be stored until it may be properly delivered. Publishers and subscribers may expose functionality corresponding to object methods as web services. Objects that access these methods may be shared across clients as similar objects expressed as serialized XML and translated to language specific objects as needed by clients.

Figure 15:
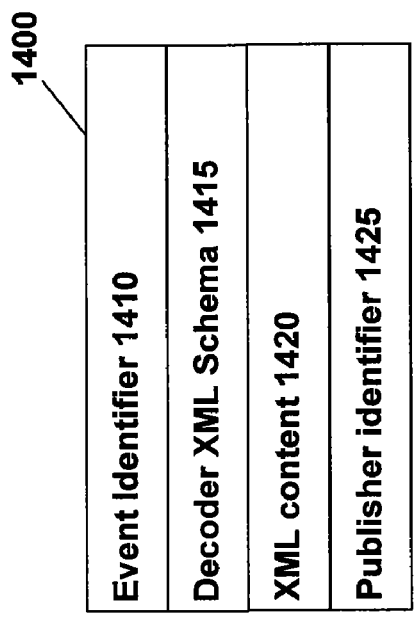
FIG. 15 is a schematic diagram of a message according to an embodiment of the present invention.

Accordingly, clients may communicate messages to the message bus 1310. The messages may be SOAP messages in some embodiments. FIG. 15 is a schematic illustration of a message 1400 according to an embodiment of the present invention. The message 1400 includes an event identifier 1410. The event identifier specifies the type of event, and may correspond to one of the event schemas 1315 of FIG. 14. The message 1400 further includes a decoder XML schema 1415. The decoder XML schema indicates how to decode the message 1400. That is, when the message bus 1310 receives the message 1400, the message bus 1310 may decode the message 1400 in accordance with the decoder XML schema 1415. The message 1400 further includes XML content 1420. The XML content 1420 describes the event, and may be wrapped in a CDATA section, such that it may not be processed itself by the message bus 1310. The generation and processing of messages includes the generation of XML schema content that may in some embodiments be analogous to the generation and processing of XML schema content described above with respect to the data block 110. The message 1400 further includes a publisher identifier 1425 that may include a URI corresponding to the publisher having posted the event. Messages and notifications sent by the message bus 1310 to client systems may have an analogous structure. In some embodiments, messages may be encrypted so that only authorized subscribers or client may access messages. Generally, any encryption methods may be used.

The messaging block 120 may include an API that implements a variety of functionalities to maintain the publishers, subscribers, and subscriptions described above with reference to FIG. 14. For example, an API implemented by the messaging block 120 may include, but is not limited to, some or all of the following procedures: CreatePublisher, ReadPublisher, DeletePublisher, CreateSubscriber, ReadSubscriber, DeleteSubscriber, CreateSubscription, ReadSubscription, DeleteSubscription, and CreateEvent. In one example, a user at a client may prepare an XML payload representing a publisher, subscriber, or subscription schema. The user then selects a function of the API, such as CreatePublisher, to operate on the XML payload. A simple user interface may be provided at the client system to facilitate this entry, which may include a text box for entry of the XML payload and a plurality of buttons corresponding to each of the methods implemented by the API, such as "CreatePublisher." Once selected, the API may de-serialize the XML instance entered by the user into an appropriate object of a code type used by the messaging block 120, such as, but not limited to, C#. The API is again called using the generated object, and appropriate objects for the messaging engine 120 may be created. For example, the API of the messaging block 120 may then return an XML result of the call and update the XML payload with any specific object names and formatting used by the messaging block 120, the message bus 1310, or both, in processing the request represented by the XML payload. For example, the XML payload may be processed by any of the methods implemented in the API to have the syntax usable by any type of messaging engine, such as a BizTalk messaging engine. Because the API providing the object names and syntax is implemented by the messaging block 120, the client system 140b and 140c need not be aware of the particular syntax or object names in order to establish a publisher, subscriber, or subscription. Detailed code examples of methods implemented by the API are provided below in the examples section. The examples are not intended to limit the use of the messaging engine 120 to any particular software language, database type, or messaging system. Rather, the examples illustrate how to implement the described functionality in one particular environment as an aid to understanding and appreciating how the methodology may also be extended to other environments, software languages, and messaging systems.

The messaging block 120 may communicate with the data block 110 for managing one or more data tables containing the notifications 1335, events 1333, publishers 1320, subscribers 1325, or subscriptions 1330. That is, in some examples, the data block 110 may be used to generate database tables for the events 1333, publishers 1320, subscribers 1325, subscriptions 1330, or combinations thereof. Recall, as described generally above, the data block 110 may create and manipulate tables in an automatic manner based on stored templates. Accordingly, templates may be stored particular to the storage, use, or both, of the message block components shown in FIG. 14. In this manner, stored software code used by the messaging block 120 may be auto-generated and stored by the data block 110 using one or more stored templates. Similarly, the data block 110 may be used to generate or process messages published to or received on the messaging bus. For example, with reference to FIG. 5, the data engine 220 may execute a message in an analogous manner to execution of a payload 230. That is, in some examples, all or a portion of the message may serve as a payload for the data block 110.

Figure 16:
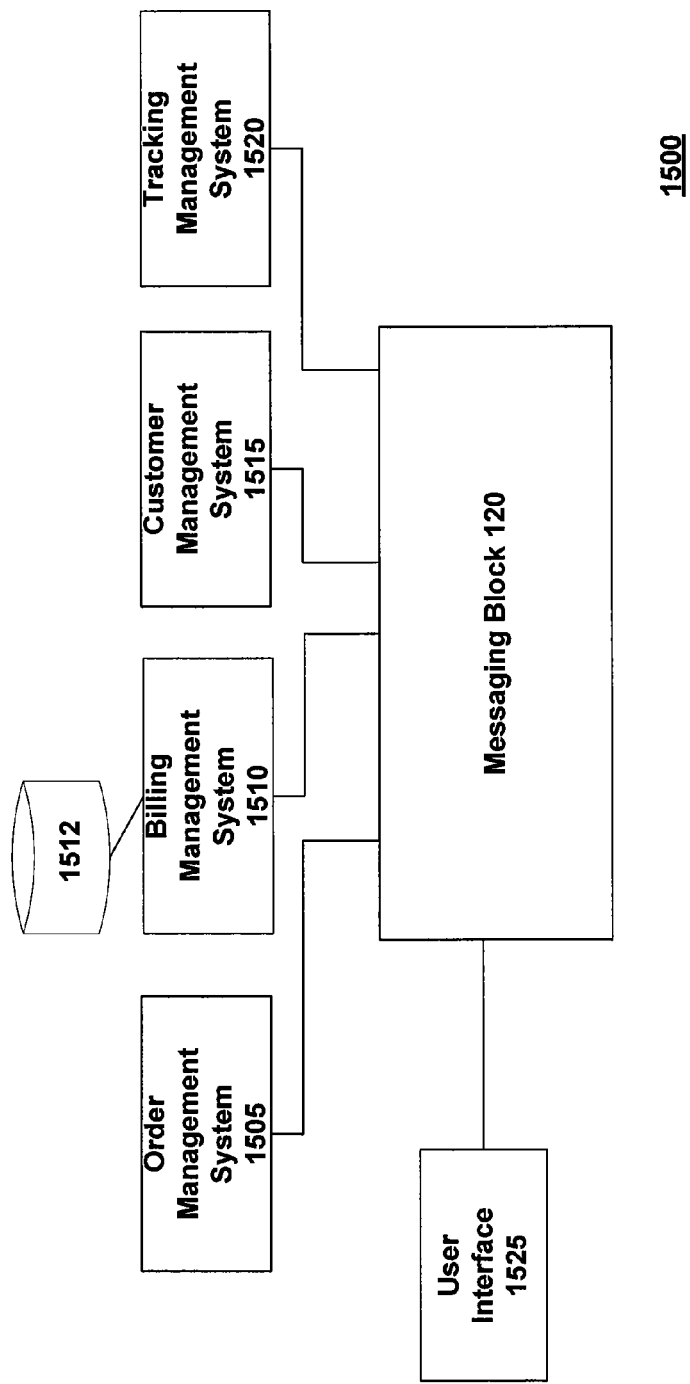
FIG. 16 is a schematic diagram of a system including a messaging block according to an embodiment of the present invention.

An example of a system 1500 utilizing an embodiment of the messaging block 120 is shown in FIG. 16. An example of establishing an account will be described. In the system 1500, a variety of client systems make use of account information including an order management system 1505 that may record orders associated with an account, a billing management system 1510 that may process billing and payment information associated with an account, a customer management system 1515 that may process and record interactions associated with an account, and a tracking management system 1520 that may track all messaging traffic for an entire enterprise. Each of the systems 1505, 1510, 1515, and 1520 may be co-located or in disparate locations, and may in some embodiments operate in part on a same computing device, although different computing devices may be used. A user interacts with the system 1500 through a user interface 1525. The user interface 1525 may be separate from the systems 1505, 1510, 1515, and 1520 as shown, or may be an integral part of any or all of those systems. Further, the user interface 1525 may indicate an interface with an actual user, system administrator, or with a computer process that serves as the user as described. The user interface 1525, as well as the systems 1505, 1510, 1515, and 1520 are in communication with the messaging block 120.

As another example, referring to FIG. 16, a method for adding the billing management system 1510 to the system 1500 will be described. A publisher is created in the messaging block for the billing management system 1510 using a publisher schema. An event schema is created for each of the events of interest that may occur inside of the billing management system 1510, such as but not limited to change billing address, add billing address, update balance owed. One or more subscribers may be created for each of the created events. For example, if the administrator is aware that the customer management system 1515 would like to subscribe to one or more of the events, a subscriber may accordingly be created. For each subscriber, a subscription may be created for implementing the delivery of a notification in the subscribing system. In some examples, the billing management system 1510 itself may be modified for use in the system 1500 coupled to the messaging block 120. For example, a processor or computer system implementing the billing management system 1510 may execute additional software including instructions to call a method CreateEvent and post an XML payload describing a billing change, or other event. Existing software executed by the billing management system 1510 may be modified for this purpose by, for example, identifying locations in the software code executed by the billing management system 1510 where events may be posted. These code locations may then be modified to post events using the CreateEvent method.

In some examples, it may not be desirable or possible to alter software code being executed by a system, such as the billing management system 1510. Accordingly, in some embodiments messages may be generated by the billing management system 1510 in a manner that does not require altering software code being executed by the billing management system 1510. For example, the billing management system 1510 may be, prior to interfacing with the messaging block 120, coupled to a database 1512 for storing billing information or other data maintained by the billing management system 1510. In one embodiment, for integration with the messaging block 120, a trigger may be added to the database 1512 that would post a change to the database 1512 into a message queue. The posting may be accomplished through, for example, a C# Assembly loaded in the database engine running on the database 1512, or through a stored procedure in the database 1512. Accordingly, the software code executed by the billing management system 1510 itself may not require alteration. In other examples, changes to the database 1512 may be stored in another database (not shown), another table, or another file system. In still another example, a web service call may be made that would post database changes directly to the message bus of the messaging block 120. In these examples, a Windows service, web service, or other process called by the message bus, may access the changes and create an event to be persisted on the message bus of the messaging block 120.

That is, a generic Assembly may be prepared having a method accepting XML as input and includes code that, when executed, maps the XML into an event payload and pushes the payload to either a message queue or the message bus. The Assembly is deployed in the database 1512. An administrator of the billing management system 1510 may then post changes to certain, or all, entities, to the method call of the Assembly deployed in the database 1512. In this manner, an intermediary system may be placed between the billing management system 1510, the database 1512, or both, that generates events corresponding to changes of the database 1512. In this manner, software code executed by the billing management system 1510 may not require alteration or recompilation.

The examples described above may still require some cooperation on the part of a system administrator for the billing management system 1510, even if the code itself may not require alteration or recompilation. In some examples, however, systems may be integrated with the messaging block 120 without such cooperation. In particular, a trigger may be generated in each table in the database 1512 corresponding to an entity of interest to the system 1500. A generic assembly may be written having a method that accepts XML and maps the XML to an event payload, and pushes the event to either a message queue in the database 1512 or the message bus of the messaging block 120. The assembly is then deployed in the database 1512. The trigger previously generated in each table calls the assembly and method to generate the events. Then, as above, an intermediary between the messaging block 120 and the database 1512 pushes the events onto the message bus of the messaging block 120. By using triggers in tables of the database 1512, no identification of entities of interest may be required within the billing management system 1510.

In still other examples, access may not be feasible for changes to either the billing management system 1510 or the database 1512. Rather, the billing management system 1510 may provide only a procedure allowing changes to entities to be obtained. To capture messages generated by the billing management system 1510 in this example, a different approach may be used. A polling event schema may be created in the messaging block 120. A publisher for the polling event schema may be created in the messaging block 120 corresponding to the message bus. A subscriber may be created in the messaging block 120 corresponding to the polling event schema. A subscription may be created in the messaging block 120 for the subscriber. The subscription may be a recurring subscription with a periodic renewal time, such as five minutes. A web service endpoint may be created in the messaging block 120 itself specifying the location of the subscription as an endpoint. The messaging block 120 may call the procedure provided by the billing management system 1510 to receive changes. The changes may be processed into an appropriate XML event and posted to the message bus.

Figure 17:
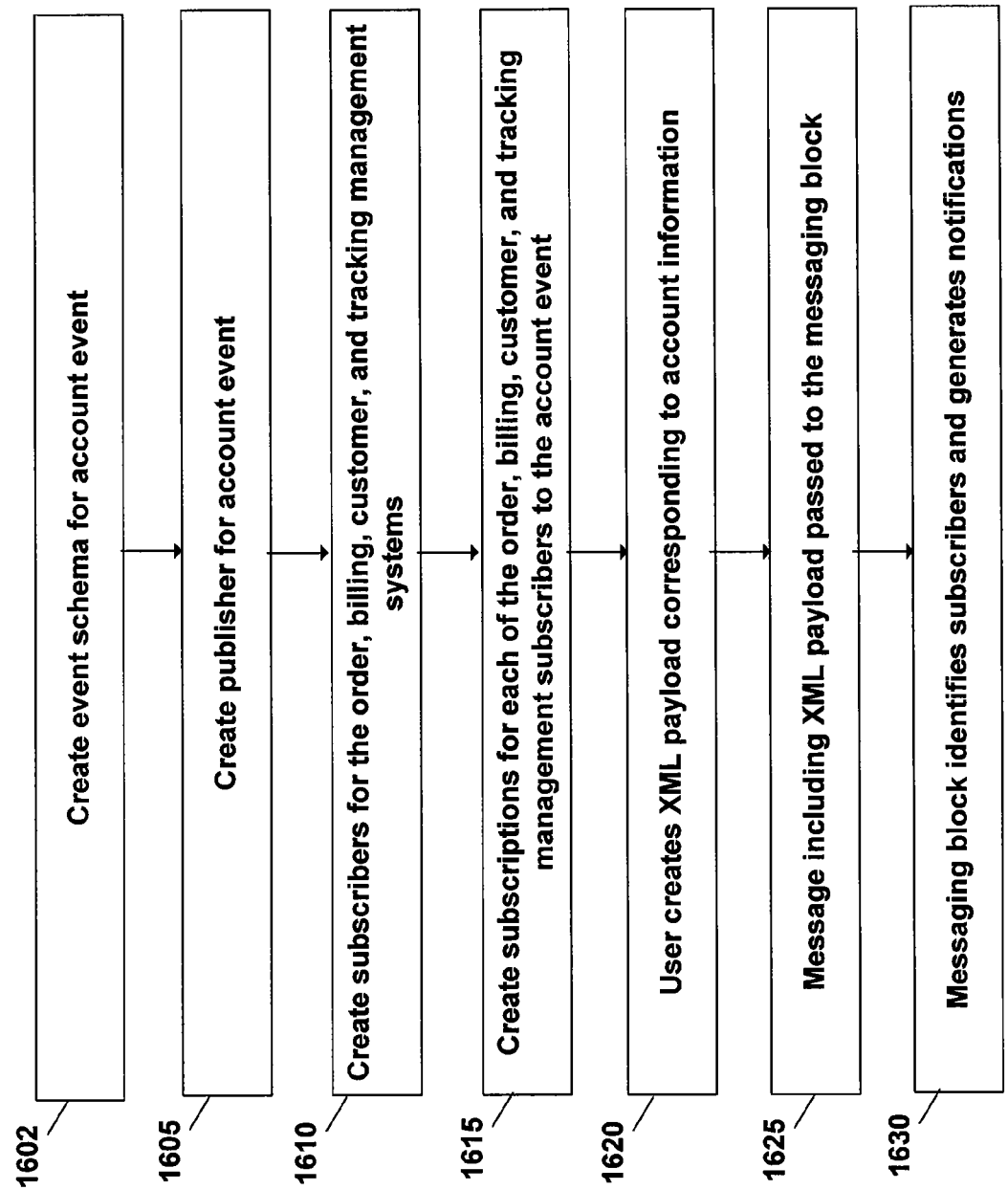
FIG. 17 is a flowchart for a method of administering and using a messaging block according to an embodiment of the present invention.

FIG. 17 is a flowchart illustrating a method for setting up the messaging block 120 to pass account messages between an account creator and the systems 1505, 1510, 1515, and 1520 of FIG. 16. The flowchart further describes a method for passing account messages. An event schema is created 1602 to describe an account event. A publisher of an account event 1605 is created. Subscribers are also created 1610 associated with each of the systems 1505, 1510, 1515, and 1520. As generally described above, the publishers and subscribers may be XML instances for each of the corresponding systems, including a system used to create accounts. Subscriptions are then created 1615 to subscribe the systems 1505, 1510, 1515, and 1520 to account events. As generally described above, the publishers and subscribers may be implemented as XML instances. The creation 1602, 1605, 1610, and 1615 may take place as part of an initial set-up of the messaging block 120 implementation of FIG. 16.

In use, a user may create 1620 an XML payload corresponding to account information. The XML payload may be created in any suitable manner, such as by utilizing a web application containing all fields of an account or a wizard that may collect information for an account. Other methods may be used in other embodiments. The user's system may then pass 1625 a message including the XML payload and an indicator that the message corresponds to an account event to the messaging block 120. The messaging block 120 may then query the subscriptions and identify 1630 subscribers to account events and generate notifications for the subscribers. Should a new system be added to the implementation of FIG. 16, and the new system also function to utilize account information, the new system may also receive notification of account events by creating a corresponding subscriber entity and subscription with the messaging block 120.

Accordingly, embodiments of messaging blocks according to the present invention may provide a publish and subscribe engine that may allow systems to access information generated by other systems in a generic manner independent of system type. Indeed, neither the system generating the message, nor the systems receiving the message, may need to know anything about the type or style of the originating or destination system. Instead, the communication is facilitated by the messaging block, allowing systems to be added, removed, or changed, in a flexible manner that may not require altering or re-compiling the software code that operates the messaging block itself. The messaging block 120 may also facilitate communication within the platform 100. The data block 110 and rule block 130 may subscribe to and publish messages on the message bus. Referring back to FIG. 2, any of the other components resident in the intelligence layer 60, adaptive layer 55, or core layer 50, may also publish message on, and receive notifications from, the message bus. In this manner, the messaging block 120 serves as a mediator of communications for the platform 100.

Rule Block

Referring back to FIG. 3, examples of the data block 110 and the messaging block 120 have been described above. Briefly, the data block 110 facilitates data storage and interaction with data sources 150 in a generic manner. The messaging block 120 facilitates message passing between one or more of the clients 140 in a generic manner. Accordingly, the platform 100 provides a flexible system for managing interactions between and among the clients 140 and the data sources 150. It may be desirable to act upon the data gathered and stored by the platform 100, also in a generic manner. Accordingly, the rule block 130 may be provided to evaluate rules dynamically through message passing.

Figure 18:
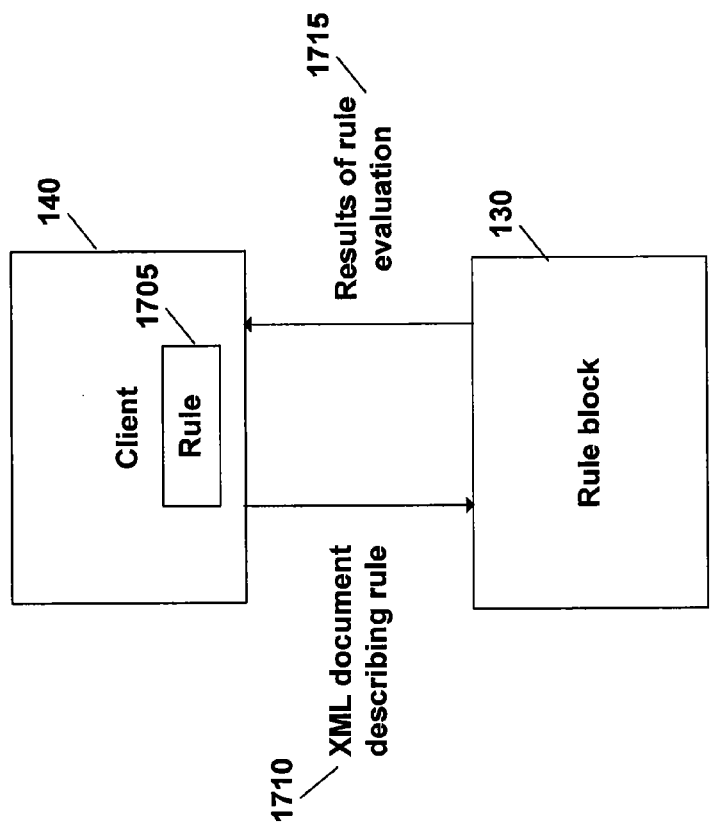
FIG. 18 is a schematic diagram of a system including a rule block according to an embodiment of the present invention.

An example of operation of the rule block 130 will be described with reference to FIG. 18. One or more rules, such as the rule 1705, may be maintained by the client 140. An XML document 1710 describing the rules 1705 is communicated to the rule block 130. Rule schemas described by the XML document 1710 may be defined during run time, or at start up. In some examples, rules may be inferred. That is, a rule may be generated in an automated fashion based on interactions or data available to the platform. For example, rules may be inferred based on an entity's interaction with different computing devices. Rules may also be inferred based on contextual information about an interaction. For example, if an entity sets a room temperature to seventy degrees at a certain time while the outside light was at a certain level, a rule may be inferred and stored with the rule block 130 that if it is a certain time and the outside light it at a certain level, an action to set the inner temperature to seventy degrees should be taken. Other types of rules may be inferred using other information available to the platform.

As with other blocks described above, communication with the rule block 130 may occur through SOAP messaging to a Web service implemented by the rule block 130. The XML document 1710 generally will include an if/then statement. The "if" statement may specify a condition, while the "then" statement may specify an action to be taken on satisfaction of the condition. The statements may reference data stored in one or more locations accessible to the rule block 130. Accordingly, the rule block 130 may access one or more data stores to retrieve information used to evaluate the if and then statements contained in the XML document. Accordingly, the rule block 130 evaluates the condition contained in the XML document 1710, and executes the then clause if the condition is satisfied. Results 1715 of the rule evaluation may be returned to the client. In this manner, rules may be independently maintained by the clients 140 and changed at any time. A variety of functionalities may be provided by the rule block 130 including, but not limited to: handling functions with an unknown number of parameters, predefined trigonometric and logarithmic functions, user-defined custom functions, variable values resolved using a callback delegate, expressions which may contain string literals, where variable values, and function return values can be strings, arithmetic operators such as +, -, /, *, ^, Boolean operators such as <, >, =, &, |, !, < >, >=, <=, and string concatenation with & or +. Functionality may be obtained from third party libraries, such as bcParser.NET or others. In an analogous manner to the data block 110, described above, the rule block 130 may be in communication with a rule template cache (not shown). The rule template cache may contain XML templates, one corresponding to each type of rule, and describe what logic to apply for each type.

In this manner, the rule block 130 may provide an engine for in-memory evaluation of a rule. Software applications of any nature may post requests to the rule block 130 to evaluate rules and return results of the evaluation. In this manner, the requesting application may not need to hard code rules and structure inside of their own applications. Accordingly, users may change the rules as needs and purposes change and the applications are decoupled from the rule changes.

The rule block 130 may communicate with the messaging block 120 and subscribe to or publish messages to the message bus. On receipt of messages of interest, the rule block 130 may take a specified action, as described above, and a result of a rule evaluation may be to publish a certain type of message back to the message bus such that other systems may be notified of the action.

System Example: Text-to-Pledge System

Accordingly, embodiments of the platform 100 shown in FIG. 3 may be used to implement a rules-based system dealing with substantially any kind of content. The specifics of the contents, including attributes and methods of particular objects, publishers, and subscribers are provided by the clients, while programming specifics concerning software code syntax, and database particulars, are provided by the platform 100. In this manner, the platform 100 may be used to process data and rules, and mediate messages in any of a variety of systems, and maybe put to any use. As an example, an application is described below for processing charity pledges made by individuals using mobile devices. This application is provided by way of example only, and it is to be understood that the platform 100 may be used in the service of virtually any end application.

Figure 19:
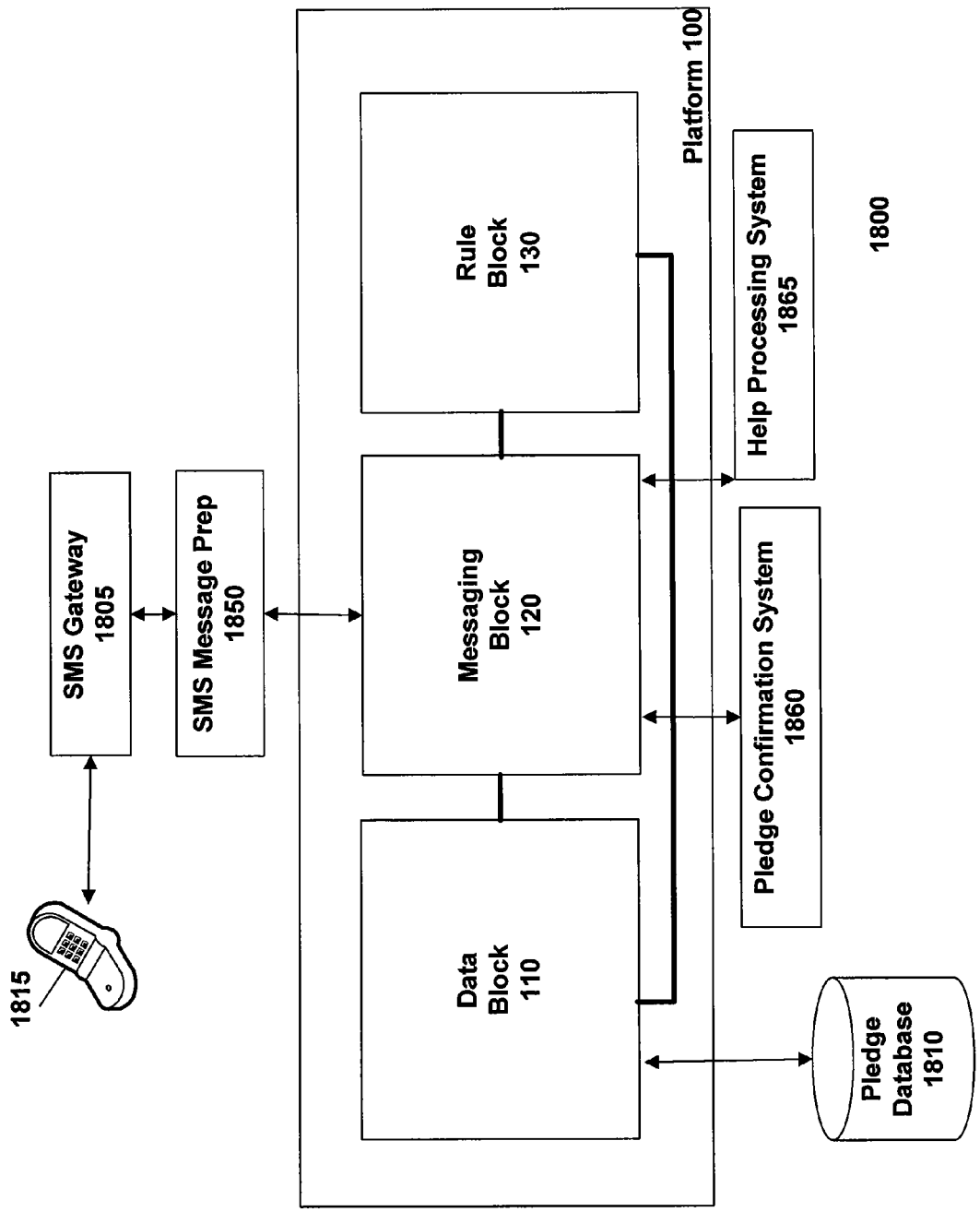
FIG. 19 is a schematic diagram of a text to pledge system using a platform according to an embodiment of the present invention.

Referring now to FIG. 19, a system 1800 is shown for processing charity pledges using an example of the platform 100. While charity pledges are given as an example, the system 1800 may generally be used to manage any type of SMS campaign. A pledge database 1810 is coupled to the data block 110 for storing pledge information including, but not limited to, email contact information, mobile phone numbers, and pledge amounts. By utilizing the data block 110 to interface with the pledge database 1810, the pledge database may be changed without requiring any changes in software run by mobile contributors or the SMS gateway 1805, as generally described above.

An SMS gateway 1805 may be established as a publisher with the messaging block 120. The messaging block 120 may, for example, expose a web service to the SMS gateway 1805. In some embodiments an SMS message preparation block 1850 may be provided to format text messages received from the SMS gateway 1805 into messages suitable for the messaging block 120, as generally described above. Any number of other subscribers may also be registered with the messaging block 120. A user may utilize a mobile device 1815, to transmit a text message containing an amount of a pledge they wish to make to the SMS gateway 1805. The mobile device 1815 may take substantially any form including but not limited to, a cell phone or a digital assistant. Other devices, which may not be mobile, may also be used including a kiosk, a POS terminal, a set-top box, or other devices. The mobile device 1815 may also be utilized to text a 'help' command to the SMS gateway 1805, as may be required by an SMS aggregator for the use of an SMS system in some examples. An owner of an SMS short code used to address text messages may be required to respond to such a 'help' message with instructions. Accordingly, the platform 100 may be able to distinguish between a 'pledge' message containing a pledge amount and a 'help' message requiring an instructional response. While a text messaging example has been described, the client device may communicate using other mechanisms, for example, a pledge may be initiated through a web browser on the client device, an email message, another mobile web application, or through a native application on the client device.

An incoming communication, such as a text message, sent from the mobile device 1815 may be received by the SMS gateway 1805 and packaged into a message suitable for the messaging block 120 by the SMS message preparation block 1850. In other embodiments, the SMS gateway 1805 itself may be configured to package the text message into a message suitable for the messaging block 120. The resulting message generated by the SMS message preparation block 1850 may be passed to the messaging block 120 and stored, for example using the data block 110. The data block 110 may communicate information, such as pledge amounts, mobile device IDs and phone numbers, to the pledge database 1810. The storage of data using the data block 110 may cause the data block 110 to publish a message to a message bus of the messaging block 120. So, for example, the data block 110 may publish a message indicative of a 'new message received' event onto the message bus. The rule block 130 may be subscribed to 'new message received' events, and may accordingly receive the message. The rule block 130 may be configured to examine the message stored in the data block 110 and take one of two actions: 1) publish a pledge confirmation event to the message bus; or 2) publish a help message event to the message bus, depending on whether the message stored in the data block 110 was a pledge or help message. Other actions may be taken by the rule block in other embodiments.

A pledge confirmation system 1860 may be subscribed to pledge confirmation events, and receive a pledge confirmation message published to the message bus by the rule block 130. On receipt of the pledge confirmation message, the pledge confirmation system 1860 may be configured to, for example, email a confirmation message to the entity who originated the pledge.

A help processing system 1865 may be subscribed to help message events and, on receipt of a help message event, the help processing system 1865 may take action by sending a text message containing requisite instructions to a mobile phone ID associated with the event.

While SMS is used in this example, the mobile device 1815 may also run a mobile web application for pledging. The mobile web application may record a pledge amount and an associated mobile device ID, such as a phone number, or any other identifier of a user pledging, such as an email address. Other information may be captured in other embodiments.

Point-of-Sale System

Figure 20:
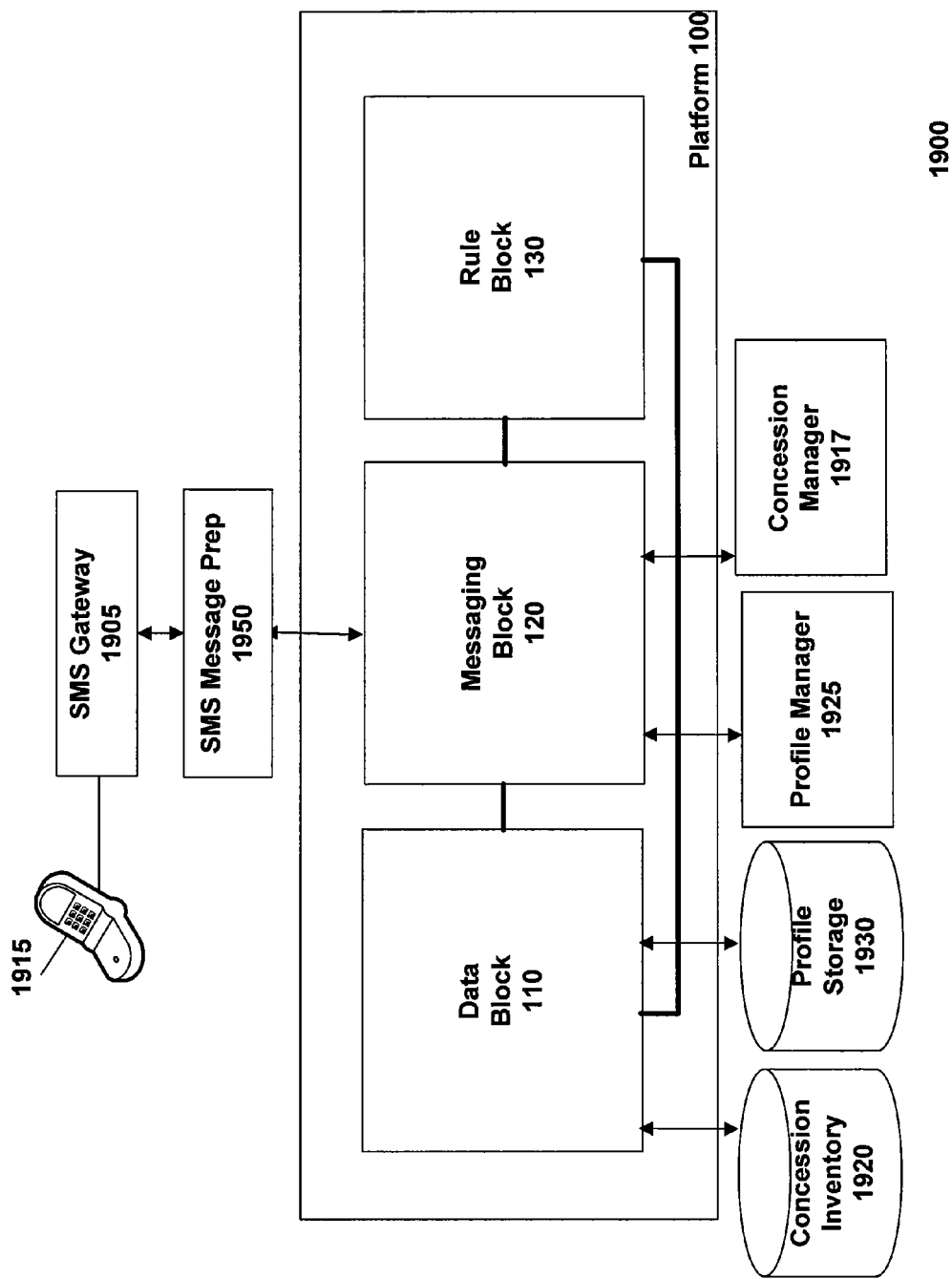
FIG. 20 is a schematic diagram of a point of sale system using a platform according to an embodiment of the present invention.

Embodiments of a platform according to the present invention may also be used to implement a point of sale system 1900, an example of which is shown in FIG. 20. A client device 1915 may be used to initiate a request to place an order or publish content or data. The client device 1915 may be any of a variety of electronic devices including, but not limited to, a cell phone, kiosk, or a point of sale terminal which may include payment capability such as a credit card reader, or more generally any device with an Internet browser or messaging capability. The client device 1915 may be mobile or fixed. An application operating on the client device 1915 may be used to indicate what type of purchase is desired. For example, a user at a concert or other event may indicate they are interested in purchasing a concession, by for example, selecting a 'concessions' link or application on the client device 1915.

Responsive to the indication the user is interested in concessions, an application on the client device 1915 may communicate with the messaging block 120 by, for example, calling a web service exposed by the messaging block 120, to publish a 'looking for concessions' message on the message bus. In some embodiments, the client device 1915 may communicate with a gateway 1905 or other communication hub 1952 that in turn communicates with the messaging block 120, as shown in FIG. 20. In some embodiments, a message preparation block 1950 may be used to format messages from the gateway 1905 or other communication hub 1952 for the messaging block 120. That is, an application operating on the client device 1915 or gateway 1905 may be registered as a publisher with the messaging block 120 and may publish an event corresponding to a user indicating a desire for concessions. The messaging block 120 may accordingly identify subscribers to that type of message, as generally described above. In some examples, a message preparation block 1950 may be used between the gateway 1905 or other communication hub 1952 and the messaging block 120 to format a message in a suitable manner for the messaging block 120.

A concession manager 1917 application may be registered as a subscriber with the messaging block 120, and may have a subscription to 'looking for concessions' messages. Accordingly, when the messaging block publishes such a message, the concession manager 1917 may be notified. The concession manager 1917 may access a concession inventory 1920 accessible at a location where the user indicated his desire for concessions. The data block 110 may facilitate data access and storage to the concession inventory 1920. The concession manager 1917 or the data block 110 may publish a message to the message bus containing information about the types, sizes, promotions and other data pertaining to the concessions.

A profile manager 1925 application may also be registered as a subscriber with the messaging block 120, and may also have a subscription to 'looking for concessions' messages. Responsive to such a message, the profile manager 1925 may utilize the data block 110 to access profile storage 1930 to access concession related preferences of a user issuing the request for concessions. The profile manager 1925 or data block 110 may then publish a message to the message bus containing the user's concession related preferences.

The rule block 130 may be subscribed to the concession availability messages and the profile messages published by the concession manager 1917 and the profile manager 1925, respectively. The messages may contain metadata indicating they are responsive to the same initial request from a user. Accordingly, on receipt of both messages at the rule block 130, the rule block 130 may evaluate which of the concession items satisfy the concession preferences. For example, if one concession preference is for "large sizes", the rule block 130 may return all available concessions that are of size large or bigger. The rule block 130 may then publish a message to the message bus containing preference-matched concessions.

The gateway 1905 or other communication hub 1952, or both, may be subscribed to the preference-matched concession messages, and may then communicate with the client device 1915 to display the choices specified by the preference-matched concession messages.

A user may then make a selection at the client device 1915 from among the preference-matched concession choices. The selection is communicated to the gateway 1905 or other communication hub 1952, or both, that may publish an order event to the message bus. Although not shown in FIG. 20, an ordering system and a payment system may be subscribed to the order messages and receive notification of the order.

Although an gateway 1905 and message preparation block 1950 are shown in FIG. 20, in other examples, a different interface may be provided to the platform 100, such as a web interface or kiosk connection. The type of interface implemented will depend in part on the type of client device used. The platform 100 may have more than one interface to accommodate a variety of client device types. Generally, any number of communication hubs may be present, and any number of client devices may communicate with each hub.

Referring again to FIG. 20, in some examples, the client device 1915 may be mobile. As a user enters a location, such as a store, they may be recognized by their client device 1915, for example through use of an RFID tag on the client device 1915 and a tag reader positioned at the location or by bluetooth communications. In some examples, other positioning technologies may be used such as GPS, cell tower triangulation, WiFi-based positioning, or combinations thereof. The detection of the user may be an event that is communicated to the message bus of the platform 100. An identification of the user, the client device 1915, or both, may also be published to the message bus.

The concession manager system 1917 may be subscribed to detected user events, and may be notified of the user's presence at a location. Using methods as described generally above, the platform may then notify the client device 1915 of available concessions or other items at the location which match preferences of the user. The notification may proceed through generally any manner, including but not limited to SMS, email message, notification in an application on the mobile device, or combinations thereof. In this manner, a retail location may interact with the platform to notify incoming potential customers of items that match one or more of the potential customer's preferences. The system remains sufficiently robust that operation may continue if the retail location's database changes or migrates to a new data format.

From the foregoing it will be appreciated that, although specific embodiments of the invention have been described herein for purposes of illustration, various modifications may be made without deviating from the spirit and scope of the invention.

Example 1

The following is an example of a code excerpt implementing a portion of a data engine generic API. The code is commented to describe what each portion accomplishes. The example is not intended to be limiting, other methods, parameter types, values, databases, and languages may be supported in other examples.

```
/// <param name="Entity">XML Payload to be passed to the
/// "as Root identified" stored procedure.</param>
/// <param name="SPSuffix">string to be appended before the
/// Root Name to build the stored procedure name to call.</param>
/// <param name="retType">Enum specifying the return type
/// from this generic Method.</param>
/// <returns>Returns an object corrsponding to None,
/// DataSet, DataReader or Scalar/String.</returns>
/// <example>This sample shows how to call the ExecuteSP method.
/// <code>
///
/// localhost.DBAPI db = new localhost.DBAPI
/// db.ExecuteSP(@"
///              <Person>
///                         <Param1 DATA_TYPE="uniqueidentifier">
/// ABCDEFAB-0000-1111-2222-333344445555}</Param1>
///                         <Param2 DATA_TYPE="nvarchar">some text</Param2>
///                         <Param3 DATA_TYPE="int">3</Param3>
///              </Person>,
///              "Create",
///              ReturnType.DataSet
///              ")
///
/// </code>
/// </example>
/// this will execute the stored procedure uspCreatePerson
/// from the Database we are accessing
///
/// First we load the Entity XML Payload into a Memory stream
/// for fast access. Then we initialize an XMLReader with the
/// Memory Stream. We use an XMLReader for fast forward traversing
/// of the Memory Stream. We traverse the Entity XML payload, grab
/// the Root and concatenate the Root to the literal
/// "usp" + SPSuffix resulting in the name of the stored procedure
/// we want to execute. Then we traverse the child elements of the
/// Entity XML Payload and for each node we build a DbParameter
/// corresponding to the element name and with the DBType parsed
/// as the DATA_TYPE attribute of that element passed in parameters
/// Param1, Param2, Param3, ... ParamN will correspond to the
/// parameters of the Stored Procedure then we execute the DbCommand
/// either as an ExecuteNonQuery for ReturnType.None or as
/// ExecuteNonQuery for ResultType.Scalar, in this case though we
/// either read the scalar as one of the output params or we execute
/// DataAdapter.Fill(ds) to get a DataSet from the executed stored
///
///
private object ExecuteSP(
    string Entity, string SPSuffix, ReturnType retType)
{
    DbCommand cmd = null;
    InitDBTemplateFromSOAPHeaders( ); //based on the existence of a passed
    //in Soap Header we override the connection string from
    //web-config with the one passed in the header
        object ret = null;
```

```
        try
        {
            ///we trace the entry point into this method we use the
///Trace statement in order to be able to trace
            /// on production boxes and to influence the level of
            ///tracing with a trace-flag in the Web-Config
            System.Diagnostics.Trace.WriteLineIf(traceSwitch.TraceVerbose,
                "Info : Executing DBAPI.CreateEntity");
            System.Diagnostics.Trace.WriteLineIf(traceSwitch.TraceVerbose,
                "Entity: " + Entity);
            /// we specify that the encoded way of the Entity payload was ASCII
            Encoding en = Encoding.ASCII;
            /// load the payload into a Memory Stream for fast access
            MemoryStream s = new MemoryStream(en.GetBytes(Entity));
            ///and then cosntruct a fast-forward only XmlTextReader to traverse
            /// the payload sequentially
            XmlTextReader xtr = new XmlTextReader(s);
            string NodeValue = "";
            string NodeName = "";
            string NodeAttribute = "";
            string ParamDir = "";
            string ParamSize = "";
            int ParamSizeInt = 0;
            ///we read the Root and grab the Name of the Element and concatenate
            /// it to the name of the Stored Procedure
            xtr.Read( );
            string EntitySchema = xtr.Name;
            Encoding ascii = Encoding.ASCII;
///CreateDbCommand is a private method that uses the DbProvider Factory object
to ///generate the appropriate ADO.NET objects specific to a Data Provider
            cmd = CreateDbCommand(SPSuffix.Length > 0 ?
///_Procedure Name is initialized in the constructor of the Web-Service as part of
the ///DatabaseTemplate Schema;
            String.Format(_ProcedureName, EntitySchema, SPSuffix) :
            EntitySchema);
            ///we loop and traverse the Entity payload looking for starting
            /// of an XML Element, for attributes, for content
            ///and eventually for the End Tag of an element; we save these
            /// values in NodeValue, NodeAttribute and NodeName
            while (xtr.Read( ))
            {
              switch (xtr.NodeType)
              {
                ///once we hit the start of an element we grab both the
                /// element Name as well as the value of the DATA_TYPE
                /// attribute
                case XmlNodeType.Element:
                    NodeName = string.Format(_ParameterFormat, xtr.Name);
                    NodeAttribute = xtr.GetAttribute("DATA_ TYPE");
                    ParamDir = xtr.GetAttribute("DIRECTION");
                    ParamSize = xtr.GetAttribute("SIZE"); break;
                ///once we hit the NodeType Text we know we found
                /// the content of the Element
                case XmlNodeType.Text:
                    NodeValue = xtr.Value; break;
                ///once we hit the NodeType CDATA we append the CDATA
                /// content to the rest of the content
                case XmlNodeType.CDATA:
                    NodeValue += " " + xtr.Value;
                    NodeValue.Trim( ); break;
                ///and once we find the closing Tag of the XML Element
                /// we look to see if all 3 required information about the
                ///element were found - if it is the root or a malformed
                /// element we skip it - and then we proceed with
                ///the creation of a DbParameter corresponding to the
                /// found information
                case XmlNodeType.EndElement:
                    if (NodeName.Length >0)
                    {
                       ///in case no DATA_TYPE attribute was found we
                       /// make the NodeAttribute "nvarchar" by default
                       if (NodeAttribute == null || NodeAttribute.Length == 0)
                           NodeAttribute = "String";
                       ///in case no DIRECTION attribute was found
                       /// we make the ParamDir IN by default
                       if (ParamDir == null || ParamDir.Length == 0)
                           ParamDir = "Input";
                       ///in case there was a SIZE attribute found we
                       /// make the ParamSizeInt the integer
                       ///corresponding to the SIZE of the SqlParam
```

```
                if (ParamSize != null && ParamSize.Length > 0)
                    ParamSizeInt = int.Parse(ParamSize);
                DbType dbType = DbType.String;
                DbParameter p = _dbProvider.CreateParameter( );
                if (ParamSizeInt > 0)
                    p.Size = ParamSizeInt;
                ///the direction of the DbParamter is
                ///assumed to be IN unless otherwise specified
                ParameterDirection direction =
                    (ParameterDirection)Enum.Parse(
                    typeof(ParameterDirection), ParamDir, true);
                p.ParameterName = NodeName;
                p.Direction = direction;
                p.Value = DBNull.Value;
    ///this function adds the generic DbParameter object to the collection of
///parameters of the Command object
                AddDbParameter(p, ref cmd, NodeAttribute);
                dbType = p.DbType;
                ///if we don't find any value for the XML
                /// Element then ignore this Parameter
                ///after that convert the passed in XML
                ///Element value to the appropriate SqlDbType
                if (NodeValue.Length > 0)
                {
                    switch (dbType)
                    {
                        case DbType.Guid:
                            p.Value = new System.Guid(NodeValue);
                            break;
                        case DbType.DateTime:
                            p.Value = DateTime.Parse(NodeValue);
                            break;
                        case DbType.Int32:
                            p.Value = int.Parse(NodeValue);
                            break;
                        case DbType.Binary:
                            p.Value = ascii.GetBytes(
                                NodeValue.PadRight(90, 'F'));
                            break;
                        case DbType.Decimal:
                            p.Value = Decimal.Parse(NodeValue);
                            break;
                        case DbType. String:
                            p.Value = NodeValue;
                            break;
                        default:
                            p.Value = NodeValue;
                            break;
                    }
                }
                else
                    p.Value = System.DBNull.Value;
                NodeName = NodeAttribute = "";
                NodeValue = ParamDir = ParamSize = "";
                ParamSizeInt = 0;
            }
            break;
        default:
            break;
    }
}
///dependent on the return type we execute a stored procedure which returns a
///DbDataReader, nothing, Scalar or a DataSet
    switch (retType)
    {
        case ReturnType.DataReader:
            DbDataReader dr = cmd.ExecuteReader( );
            StringBuilder sb = new StringBuilder(@"<RESPONSE>");
            while (dr.Read( ))
            {
                sb.AppendFormat(@"<{0}>", EntitySchema);
                for (int i = 0; i <dr.VisibleFieldCount; i++)
        sb.AppendFormat(@"<{0 }>{1 }</{0 }>", dr.GetName(i),
            dr.GetValue(i).ToString( ));
                sb.AppendFormat(@"</{0}>", EntitySchema);
            }
            dr.Close( );
            sb.Append(@"</RESPONSE>");
            ret = sb.ToString( );
            break;
```

-continued

```
      case ReturnType.None:
        cmd.ExecuteNonQuery( );
        StringBuilder sbNone = new StringBuilder(@"<RESPONSE>");
        foreach (DbParameter p in cmd.Parameters)
        {
          if (p.Direction == ParameterDirection.Output ||
            p.Direction == ParameterDirection.InputOutput)
              sbNone.AppendFormat(@"<{0}>{1 }</{0 }>", p.ParameterName,
                p.Value.ToString( ));
        }
        sbNone.Append(@"</RESPONSE>");
        ret = sbNone.ToString( );
        break;
      case ReturnType.Scalar:
        ret = cmd.ExecuteScalar( );
        break;
      case ReturnType.DataSet:
        DbDataAdapter da = _dbProvider.CreateDataAdapter( );
        da.SelectCommand = cmd;
        DataSet ds = new DataSet( );
        da.Fill(ds);
        ret = ds;
        break;
    }
  }
  catch (XmlException xe)
  {
    System.Diagnostics.Trace.WriteLineIf(traceSwitch.TraceError,
      String.Format(@"ERROR reading XML in DBAPI.ExecuteSP(
      Entity: {0}, SPSuffix: {1}, ReturnType: {2} >> Error: {3})",
      Entity, SPSuffix, retType, xe.Message));
    throw (xe);
  }
  catch (DbException de)
  {
    System.Diagnostics.Trace.WriteLineIf(traceSwitch.TraceError,
      String.Format(@"SQL ERROR in DBAPI.ExecuteSP(Entity: {0},
      SPSuffix: {1}, ReturnType: {2} >> Error: {3})",
      Entity, SPSuffix, retType, de.Message));
    throw (de);
  }
  catch (Exception x)
  {
    System.Diagnostics.Trace.WriteLineIf(traceSwitch.TraceError,
      String.Format(@"ERROR in DBAPI.ExecuteSP(Entity: {0},
      SPSuffix: {1}, ReturnType: {2} >> Error: {3})",
      Entity, SPSuffix, retType, x.Message));
    throw (x);
  }
  finally
  {
    cmd.Connection.Close( );
  }
  return ret;
}
```

Example 2

In Example 1, the example API made use of the function CreateDbCommand. An example of an implementation of this command is:

```
private DbCommand CreateDbCommand(string CommandText)
{
  DbCommand cmd = _dbProvider.CreateCommand( );
  cmd.CommandText = CommandText;
  cmd.CommandType = CommandType.StoredProcedure;
  cmd.Connection = _dbConnection;
  cmd.Connection.Open( );
  return cmd;
}
```

/// _dbProvider is used to create the command. The Factory object _dbProvider, once properly constructed, knows how to instantiate the appropriate ADO.NET objects specific to each DataProvider. The _dbProvider object can be initialized with reference to the constructor of the Web-Service:

```
public DBAPI( )
{
  _providerName =
    ConfigurationSettings.AppSettings["providerName"];
  _dbProvider = DbProviderFactories.GetFactory(_providerName);
  _dbConnection = _dbProvider.CreateConnection( );
  _dbConnection.ConnectionString =
    ConfigurationSettings.AppSettings["Connection"];
  InitCache( );
  GDBCL.DatabaseTemplate DatabaseTemplate =
    Context.Cache[_CacheKey] as GDBCL.DatabaseTemplate;
  _ProcedureName = DatabaseTemplate.ProcedureName;
  _ParameterFormat = DatabaseTemplate.ParameterFormat;
  InitializeComponent( );
  this._EventLogMachine =
```

-continued

```
ConfigurationSettings.AppSettings["EventLogMachine"];
    this._EventLogName =
    ConfigurationSettings.AppSettings["EventLogName"];
    this._EventLogSource =
    ConfigurationSettings.AppSettings["EventLogSource"];
    this._TraceSwitch =
    ConfigurationSettings.AppSettings["TraceSwitch"];
    traceSwitch = new TraceSwitch(this._TraceSwitch, "Trace Switch
        for " + this._EventLogName);
    traceSwitch.Level =
    (System.Diagnostics.TraceLevel)System.Int32.Parse(
        ConfigurationSettings.AppSettings["traceSwitch"]);
    SetupListeners( );
}
```

/// The providerName is a String in the configuration file. Examples of such a string are System.Data.SqlClient or System.Data.OracleClient. Once we get an instance of the Provider Factory object, we can use it to create on the fly appropriate ADO.NET object for any Data Provider.

Example 3

An example of functions of a data engine generic API according to the present invention are shown below. Functions to manage entities in target databases may be implemented using the ExecuteSP function described in Example 1. Specifically, in this example, four functions for managing an entity are implemented—CreateEntity, ReadEntity, UpdateEntity, and DeleteEntity. CreateEntity is implemented as follows:

```
[WebMethod]
[SoapHeader("dbwsHeader",Direction=SoapHeaderDirection.In)]
public string CreateEntity(string Entity)
{
    return ExecuteSP(Entity, "Create", ReturnType.None).ToString( );
}
```

Similarly, the other functions of the API are ExecuteSP_DataReader, ExecuteSP_DataSet, ExecuteSP_None, ExecuteSP_Scalar They all are implemented by passing in appropriate parameters into the same function, ExecuteSP. For example ExecuteSP_DataReader is implemented as:

```
[WebMethod]
[SoapHeader("dbwsHeader", Direction = SoapHeaderDirection.In)]
public string ExecuteSP__DataReader(string Entity)
{
    return (string)ExecuteSP(Entity, "", ReturnType.DataReader);
}
```

If you look back at the signature of the function ExecuteSP, you can see that it has a very flexible signature that allows us to serve any type of request from the previously presented functions:
    private object ExecuteSP(string Entity, string SPSuffix, ReturnType retType)
    Entity, represents the XML string passed into the API, SPSuffix represents a string that gets prepended to the passed in Stored Procedure Name. For example in the case of the CRUD functions presented previously, the Create, Read, Update and Delete, suffixes can be prepended to the Stored Procedure name. In this manner, an Entity with the same XML payloads as we showed previously as the Person Entity can be managed. The third parameter allows different types of returned objects from the API.

Example 4

Examples of methods provided by an API implemented by the messaging engine 120 are provided below. In particular, the methods below are an example of software code used to implement CreatePublisher, ReadPublisher, DeletePublisher, ReadSubscription, and CreateEvent for operation with a BizTalk message bus. While BizTalk is used here as an example, any messaging system, including a custom system, may be used and appropriate software code drafted using the particularities of the message system.
CreatePublisher

```
[WebMethod]
public void CreatePublisher(Publisher Publisher)
{
    ReceivePort rcvPort = CreateReceivePort(Publisher.Name);
    CreateReceiveLocation(rcvPort, Publisher.TransportType,
Publisher.ReceivePipeline,
        Publisher.URL);
    CreateSendPortGroup(Publisher.Name,
    GetXmlFromFilter(Publisher.Filter));
    _catalog.SaveChanges( );
}
```

The function of the CreatePublisher method is to create a publisher using specific BizTalk objects. Basically, creation of a publisher in BizTalk may include: creating a ReceivePort with a same name as the Publisher, creating a ReceiveLocation associated with the ReceivePort having a same Name, TransportType, ReceivePipeline, and LocationURI of the Publisher, creating a SendPortGroup having a same Name and Filter as the Publisher.
ReadPublisher

```
[WebMethod]
public Publishers ReadPublisher(string PublisherName)
{
    Publishers pubs = new Publishers( );
    int pbsCount;
    if (PublisherName.Length == 0)
    {
        pbsCount = _catalog.ReceivePorts.Count;
        pubs.Publisher = new Publisher[pbsCount];
        for(int i=0; i<pbsCount; i++)
            pubs.Publisher[i] = GetPublisher(_catalog.ReceivePorts[i]);
    }
    else
    {
        pubs.Publisher = new Publisher[1];
        pubs.Publisher[0] =
        GetPublisher(_catalog.ReceivePorts[PublisherName]);
    }
    return pubs;
}
```

This method creates a Publishers array, checks the PublisherName passed in for an empty name, returns publishers identified by that Name, allocates an array of Publisher objects when the PublisherName is empty and adds publishers emitted by the BizTalk catalog object to the empty PublisherName. The ReadPublisher method uses a GetPublisher method to implement a search for a given Publisher by looking up the BizTalk object-model starting with a ReceivePort object. An example of code used to implement GetPublisher is:

```
private Publisher GetPublisher(ReceivePort rPort)
{
    Publisher pub = new Publisher( );
    if (rPort.ReceiveLocations.Count == 0)
        return pub;
    ReceiveLocation rLoc = rPort.ReceiveLocations[0];
    pub.Name = rPort.Name;
    pub.URL = rLoc.Address;
    pub.TransportType = rLoc.TransportType.Name;
    SendPortGroup spg = _catalog.SendPortGroups[pub.Name];
    if (spg != null)
        pub.Filter = GetFilterFromXml(spg.Filter);
    return pub;
}
DeletePublisher
    [WebMethod]
    public void DeletePublisher(string PublisherName)
    {
            DeleteSendPortGroup(PublisherName);
            DeleteReceivePort(PublisherName);
            _catalog.SaveChanges( );
    }
ReadSubscription
    [WebMethod]
    public Subscriptions ReadSubscription(Subscription subscription)
    {
        Subscriptions subs = new Subscriptions( );
        Subscription s;
        SendPortGroup spg;
        int sbsCount = 0;
        int index = 0;
        if (subscription.PublisherName.Length == 0 &&
subscription.SubscriberName.Length == 0)
        {
            //get all subscription
            for (int i = 0; i < _catalog.SendPortGroups.Count; i++)
                sbsCount +=
_catalog.SendPortGroups[i].SendPorts.Count;
            subs.Subscription = new Subscription[sbsCount];
            for (int i = 0; i < _catalog.SendPortGroups.Count; i++)
            {
                for (int j = 0;
                j < _catalog.SendPortGroups[i].SendPorts.Count; j++)
                {
                    s = new Subscription( );
                    s.PublisherName = _catalog.SendPortGroups[i].Name;
                    s.SubscriberName =
((SendPort)_catalog.SendPortGroups[i].SendPorts[j]).Name;
                    subs.Subscription[index++] = s;
                }
            }
        }
        else if (subscription.PublisherName.Length == 0)
        {
            //get all subscription for given subscriber
            subs.Subscription =
new Subscription[_catalog.SendPortGroups.Count];
            for (int i = 0; i< _catalog.SendPortGroups.Count ; i++)
            {
                spg = _catalog.SendPortGroups[i];
                for (int j = 0; j < spg.SendPorts.Count ; j++)
                {
                    if (((SendPort)spg.SendPorts[j]).Name ==
subscription.SubscriberName)
                    {
                        s = new Subscription( );
                        s.PublisherName = spg.Name;
                        s.SubscriberName = subscription.SubscriberName;
                        subs.Subscription[index++] = s;
                    }
                }
            }
        }
        else if(subscription.SubscriberName.Length == 0)
        {
            // get all subscription for given Publisher
            spg = _catalog.SendPortGroups[subscription.PublisherName];
            sbsCount = spg.SendPorts.Count;
            subs.Subscription = new Subscription[sbsCount];
```

```
            for(int i = 0; i < sbsCount; i++)
            {
                s = new Subscription( );
                s.PublisherName = subscription.PublisherName;
                s.SubscriberName =((SendPort)spg.SendPorts[i]).Name;
                subs.Subscription[i] = s;
            }
        }
        else
        {
            //return empty array of subscriptions
            subs.Subscription = new Subscription[1];
            subs.Subscription[0] = subscription;
        }
        return subs;
    }
```

The ReadSubscription method builds an array with all subscriptions in the system when there is no given PublisherName and no given SubscriberName as part of the incoming Subscription parameter. A total number of SendPortGroups in the BizTalk database is retrieved and array of Subscriptions objects of that size allocated. A list of associated SendPorts is retrieved for each SendPortGroup. For each SendPort, a Subscription object is created. The Subscription→PublisherName is set to the SendPortGroup→Name. The Subscription→SubscriberName is set to the current SendPort→Name in the iteration. The Subscription object is attached to the array of Subscriptions that will be returned.
CreateEvent

```
    [WebMethod]
    public void CreateEvent(Event vEvent)
    {
        Publishers pubs = ReadPublisher(vEvent.PublisherName);
        foreach(Publisher pub in pubs.Publisher)
        {
            if (pub.TransportType == TransportType.file)
            {
                string GUID = System.Guid.NewGuid( ).ToString( );
                string FileName = String.Format(@"{0}\{1}-{2}.xml",
pub.URL.Substring(0,
                    pub.URL.LastIndexOf(@"\")), pub.Name, GUID);
                StreamWriter outFile = new StreamWriter(FileName, true);
                outFile.Write(vEvent.Content);
                outFile.Close( );
            }
        }
    }
```

The CreateEvent method may allow clients to push an Event on a message bus. The above implementation reflects a case when a Publisher pushes events by copying an XML payload into a folder on a target machine. Other implementations may also be used. Generally, messages may be written by any mechanism to a Receive Port's location, from where the message bus may pick the messages up and process them. The mechanism used to push a file into the Location of a Receive Port may include, but is not limited to, manually copying the files, an http post, or having an application create files in a specific location.

The CreateEvent method above generally gets meta-data associated with the Publishers of the Name passed in. For a zero-length PublisherName, all Publisher objects are obtained. For a given PublisherName, a specific Publisher is obtained. For each Publisher object returned, the TransportType and URL of the Publisher is obtained. A file is created, with a name having a unique identifier. The Content field of the passed in Event object is written to the file, and the file is closed.

What is claimed is:

1. A method of communicating with one or more databases, the method comprising:
   receiving a first call for a target database, wherein the target database is configured to use a first querying language, the call including a command and a payload, the command being generic and not specific to the first querying language, the payload including at least one first method element, at least one first parameter associated with the first method element and a first trigger indicator;
   processing the payload to unpack the at least one first method element and at least one first parameter;
   calling the target database using the first method element and the at least one parameter responsive to encountering the trigger indicator;
   receiving a second call for a second target database, wherein the second target database is configured to use a second querying language different from the first querying language, the second call including the command and a second payload, the second payload including at least a second method element, at least a second parameter associated with the second method element and at least a second trigger indicator, the second method name being specific to the second database;
   processing the second payload to unpack the at least second method element and at least second parameter; and
   calling the second target database using the second method element and second parameter responsive to encountering the trigger indicator.

2. The method of communicating according to claim 1 wherein the act of processing the second payload occurs after the act of processing the first payload and a same programming interface receives both the first and second payload during runtime.

3. The method of communicating according to claim 1 wherein the act of processing the second payload occurs without recompiling the programming interface.

4. The method of communicating according to claim 1 further comprising:
   receiving an indicator, separately from the receipt of the command and the payload, of a type of target database for which the call is directed;
   traversing the payload and a template specific to the first target database configured to use the first querying language; and
   formatting the at least one first method element and parameter in a manner dictated by the template to generate the call specific to the first querying language for the first target database.

5. The method according to claim 4 wherein the indicator comprises a portion of a web.config file.

6. The method according to claim 4 wherein the indicator is included in a SOAP header.

7. The method according to claim 4 wherein the template comprises an XML schema.

8. The method of communicating according to claim 4 further comprising:
   receiving a second call for a second target database, wherein the second target database is configured to use a second querying language different from the first querying language, the second call including the command and a second payload, the second payload including at least a second method element, at least a second parameter associated with the second method element and at least a second trigger indicator, the second method name being specific to the second database;
   processing the second payload to unpack the at least second method element and at least second parameter;
   traversing a second template specific to the second querying language for the target database and formatting the unpacked method and parameter according to the second template to generate a second call specific to the second querying language for the target database; and
   calling the second target database with the second call responsive to encountering the trigger indicator.

9. The method according to claim 8 wherein the act of calling the first database and the act of calling the second database are performed by a same engine during runtime.

10. The method according to claim 9 wherein the acts of calling the first and second database are performed without a need to recompile the engine.

11. The method according to claim 1 wherein the payload comprises an XML schema.

12. A method for communicating with a plurality of databases, each configured to use a different querying languages, the method comprising:
   transmitting a first call including a command and a payload to a data engine, the command and the payload being generic and not specific to any of the querying languages;
   transmitting a first indicator of a first target database type for the first call to the data engine, the data engine configured to process the payload according to a first template specific to the first target database type configured to use a first querying language to generate a function call specific to the first target database type, wherein the first template specifies at least one object used by the first target database type and a data format for the at least one object in accordance with the first querying language; transmitting a second call including the command and the payload to the data engine; and
   transmitting a second indicator of a second target database type for the second call to the data engine, the data engine configured to process the payload responsive to the second indicator according to a second template specific to the second target database type configured to use a second querying language, different from the first querying language, to generate a second function call specific to the second target database type, wherein the second template specifies at least one object used by the second target database type and a data format for the at least one object used by the second target database in accordance with the second querying language.

13. The method according to claim 12 wherein the data engine is configured to operate without a need to recompile between processing the first and second calls.

14. The method according to claim 12 wherein the first and second indicators are contained in SOAP headers and the first and second templates each comprise respective XML schemas.

15. A non-transitory computer readable medium encoded with executable instructions that, when executed, cause a processor to communicate with one or more databases, the computer readable medium storing instructions for:
   receiving a call for a target database configured to use a first querying language, the call including a command and a first payload, the command being generic and not specific to the first querying language, the first payload including at least one first method element, at least one first parameter associated with the method element and a first trigger indicator;

processing the payload to unpack the at least one first method element and at least one first parameter element; and calling the target database using the first method element and the at least one parameter responsive to encountering the first trigger indicator;

receiving a second call for a second target database configured to use a second querying language different from the first querying language, the second call including the command and a second payload, the second payload including at least a second method element, at least a second parameter associated with the second method element and at least a second trigger indicator, the second method name being specific to the second database;

processing the second payload to unpack the at least second method element and at least second parameter; and calling the second target database using the second method element and second parameter responsive to encountering the trigger indicator; and wherein the instructions for processing the second payload and the first payload are executable during runtime without a need to recompile the computer readable instructions between processing acts.

16. A system for communicating with one or more databases, the system comprising:

a first target database configured to use a first querying language;

a second target database configured to use a second querying language;

a template memory storing at least one first data template specifying at least one object used by the first target database and a data format for the at least one object in accordance with the first querying language, the template memory further storing at least a second data template specifying at least one object used by the second target database and a data format for the at least one object used by the second target database in accordance with the second querying language;

a data engine coupled to the first target database and the schema repository, the data engine configured to receive a payload for the first target database, load the at least one data template, traverse the data payload and the first data template, format the data payload in accordance with the first data template to generate an executable for the first target database, and transmit the executable to the first target database, the data engine further configured to receive the payload and an indication the second querying language is desired, the data engine configured to load the second data template responsive to the indication of the second querying language and format the payload in accordance with the second data template to generate an executable for the second target database without a need to recompile the data engine.

* * * * *